US011991654B2

(12) United States Patent
Sonobe

(10) Patent No.: US 11,991,654 B2
(45) Date of Patent: May 21, 2024

(54) COMMUNICATION SYSTEM, COMMUNICATION METHOD, AND COMMUNICATION PROGRAM

(71) Applicant: NEC Corporation, Tokyo (JP)

(72) Inventor: Satoshi Sonobe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 266 days.

(21) Appl. No.: 17/518,927

(22) Filed: Nov. 4, 2021

(65) Prior Publication Data

US 2022/0159591 A1 May 19, 2022

(30) Foreign Application Priority Data

Nov. 16, 2020 (JP) ................................ 2020-189940

(51) Int. Cl.
*H04W 56/00* (2009.01)

(52) U.S. Cl.
CPC ................................ *H04W 56/001* (2013.01)

(58) Field of Classification Search
CPC ............ H04W 56/001; H04W 56/0055; H04L 45/245
See application file for complete search history.

(56) References Cited

U.S. PATENT DOCUMENTS 10,104,657 B2 * 10/2018 Otsu ................ H04W 72/0446
10,931,434 B2 * 2/2021 Ogawa .................... H04L 69/40
2015/0223098 A1 * 8/2015 Sze ..................... H04L 43/0829 370/235
2017/0070990 A1 * 3/2017 Otsu ................ H04W 56/0015
2018/0234884 A1 * 8/2018 Nakagawa ............ H04W 24/08
2018/0241538 A1 * 8/2018 Ogawa .................. H04J 3/0673
2018/0287688 A1 * 10/2018 Otsu ..................... H04J 3/0658

FOREIGN PATENT DOCUMENTS

WO 2014/174768 A1 10/2014
WO 2016/072038 A1 5/2016

* cited by examiner

*Primary Examiner* — Yemane Mesfin
*Assistant Examiner* — Salma Ayad

(57) ABSTRACT

In order to provide a communication system and the like which are capable of updating a correction value of a time synchronization packet, and to which a traffic bonding scheme is applied, a set of primary devices of the communication system determines presence or absence of communication in a first transmission path, adds an actual measurement value of a first delay amount to an information value when a determination result according to the determination is that the communication is present, or adds, to the information value, a design value of a second delay amount being the delay amount inside the wireless transmission device and the wireless reception device when the determination result is that the communication is absent.

7 Claims, 9 Drawing Sheets

COMMUNICATION SYSTEM 1000
FIRST TRANSMISSION PATH 91
SECOND TRANSMISSION PATH 92
GNSS SATELLITE
11
GNSS RECEIVER
12
MASTER DEVICE
13
SLAVE DEVICE
14
FIRST WIRELESS RELAY DEVICE
21
SECOND WIRELESS RELAY DEVICE
22
THIRD WIRELESS RELAY DEVICE
23
FOURTH WIRELESS RELAY DEVICE
24
31
32
33
34
41
42

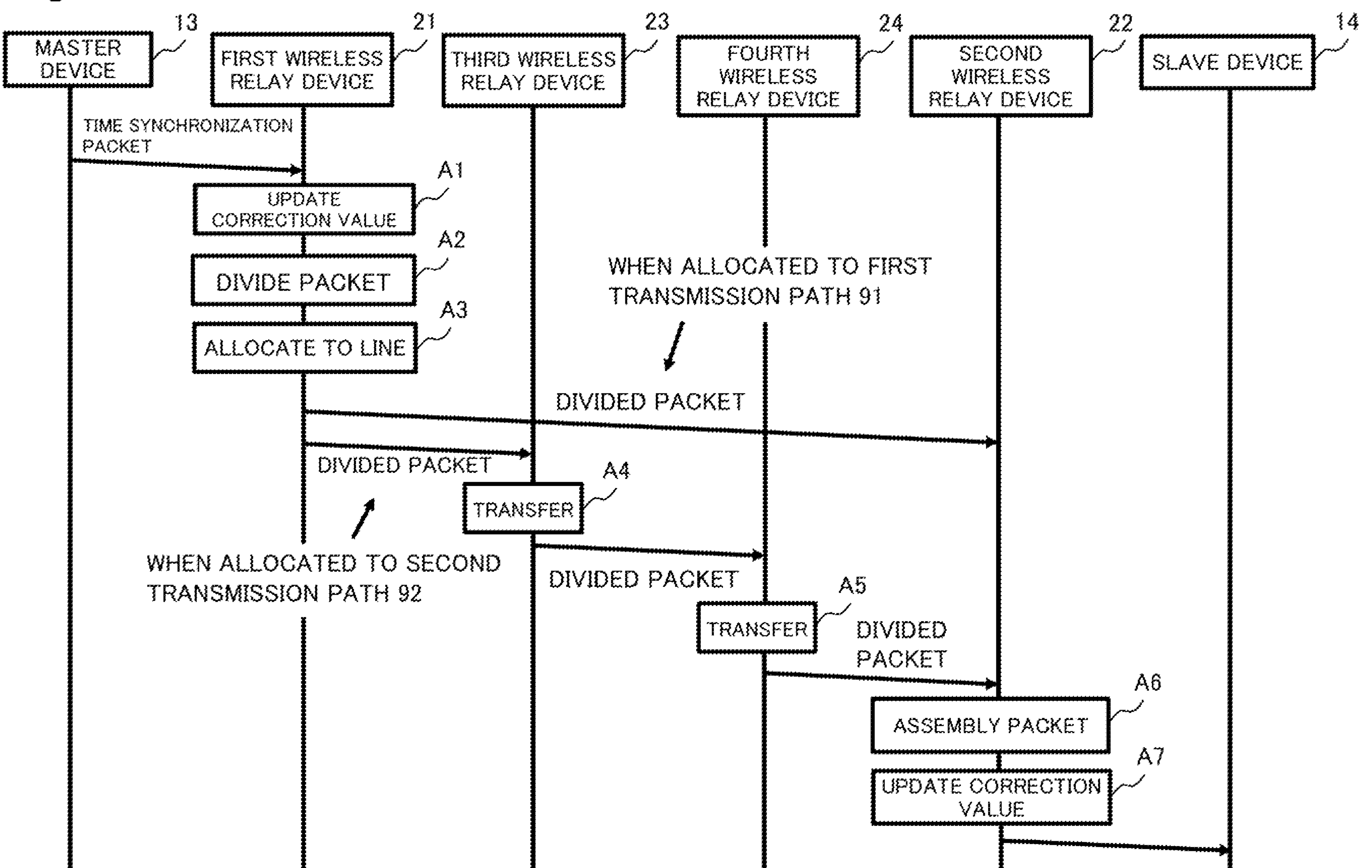
Fig.2
MASTER DEVICE
13
FIRST WIRELESS RELAY DEVICE
21
THIRD WIRELESS RELAY DEVICE
23
FOURTH WIRELESS RELAY DEVICE
24
SECOND WIRELESS RELAY DEVICE
22
SLAVE DEVICE
14
TIME SYNCHRONIZATION PACKET
A1
UPDATE CORRECTION VALUE
A2
DIVIDE PACKET
A3
ALLOCATE TO LINE
WHEN ALLOCATED TO FIRST TRANSMISSION PATH 91
DIVIDED PACKET
DIVIDED PACKET
WHEN ALLOCATED TO SECOND TRANSMISSION PATH 92
A4
TRANSFER
DIVIDED PACKET
A5
TRANSFER
DIVIDED PACKET
A6
ASSEMBLY PACKET
A7
UPDATE CORRECTION VALUE

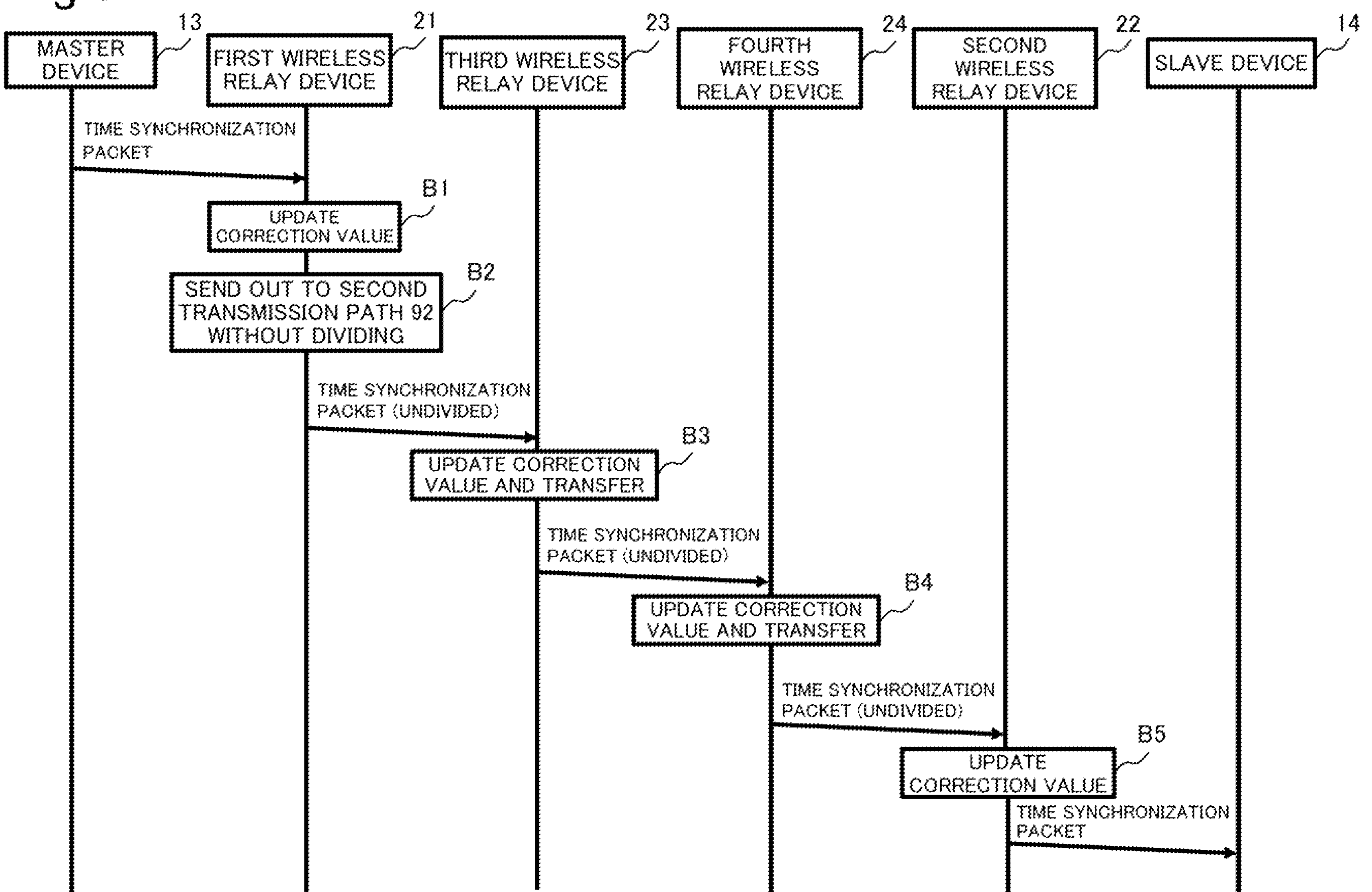

Fig.3
MASTER DEVICE
13
FIRST WIRELESS RELAY DEVICE
21
THIRD WIRELESS RELAY DEVICE
23
FOURTH WIRELESS RELAY DEVICE
24
SECOND WIRELESS RELAY DEVICE
22
SLAVE DEVICE
14
TIME SYNCHRONIZATION PACKET
B1
UPDATE CORRECTION VALUE
B2
SEND OUT TO SECOND TRANSMISSION PATH 92 WITHOUT DIVIDING
TIME SYNCHRONIZATION PACKET (UNDIVIDED)
B3
UPDATE CORRECTION VALUE AND TRANSFER
TIME SYNCHRONIZATION PACKET (UNDIVIDED)
B4
UPDATE CORRECTION VALUE AND TRANSFER
TIME SYNCHRONIZATION PACKET (UNDIVIDED)
B5
UPDATE CORRECTION VALUE
TIME SYNCHRONIZATION PACKET

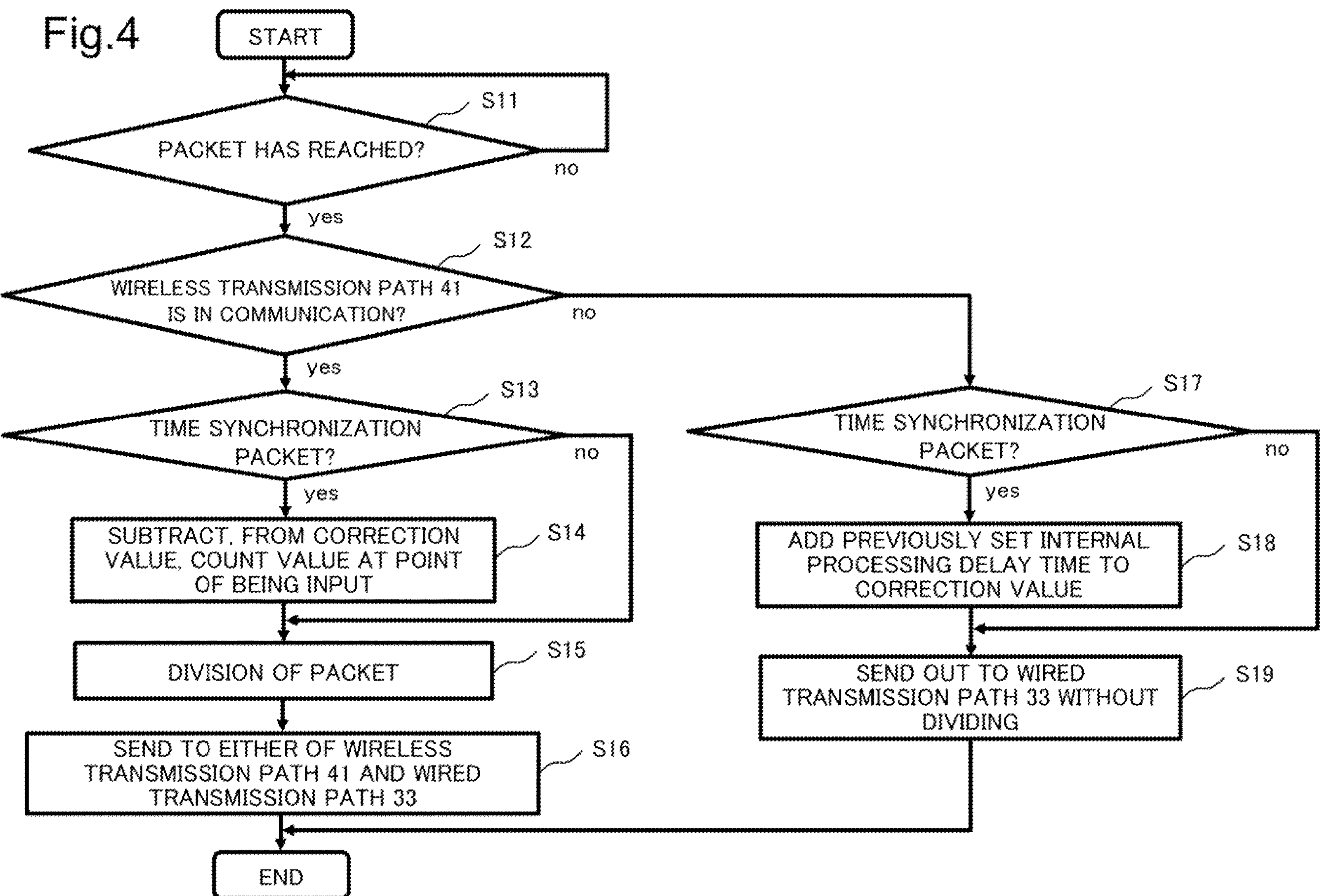
Fig.4
START
S11
PACKET HAS REACHED?
no
yes
S12
WIRELESS TRANSMISSION PATH 41 IS IN COMMUNICATION?
no
yes
S13
TIME SYNCHRONIZATION PACKET?
no
yes
S14
SUBTRACT, FROM CORRECTION VALUE, COUNT VALUE AT POINT OF BEING INPUT
S15
DIVISION OF PACKET
S16
SEND TO EITHER OF WIRELESS TRANSMISSION PATH 41 AND WIRED TRANSMISSION PATH 33
S17
TIME SYNCHRONIZATION PACKET?
no
yes
S18
ADD PREVIOUSLY SET INTERNAL PROCESSING DELAY TIME TO CORRECTION VALUE
S19
SEND OUT TO WIRED TRANSMISSION PATH 33 WITHOUT DIVIDING
END 41
21
FIRST WIRELESS RELAY DEVICE
215
WIRELESS PROCESSING UNIT
216
DELAY MEASUREMENT UNIT
217
LINE MONITORING UNIT
214
PACKET PROCESSING UNIT
21b
LINE ALLOCATION PROCESSING UNIT
21a
DIVISION PROCESSING UNIT
219
PORT UNIT
33
CONNECTED TO THIRD WIRELESS RELAY DEVICE 23
211
COUNTER
213
CORRECTION VALUE UPDATE UNIT
218
PACKET IDENTIFICATION UNIT
212
PORT UNIT
31
CONNECTED TO MASTER DEVICE 13

START
S31
PACKET HAS REACHED?
no
yes
S32
DIVIDED PACKET?
no
yes
S33
ASSEMBLY OF PACKET
S34
TIME SYNCHRONIZATION PACKET?
no
yes
S35
WIRELESS TRANSMISSION PATH 41 IS IN COMMUNICATION?
no
yes
S36
ADD COUNT VALUE AT SUCH POINT TO CORRECTION VALUE
S37
ADD PREVIOUSLY SET INTERNAL PROCESSING DELAY TIME TO CORRECTION VALUE
S38
SEND OUT TO WIRED TRANSMISSION PATH 32
END 22
SECOND WIRELESS RELAY DEVICE
221
COUNTER
226
DELAY MEASUREMENT UNIT
227
LINE MONITORING UNIT
224
PACKET PROCESSING UNIT
225
WIRELESS PROCESSING UNIT
22a
ASSEMBLY PROCESSING UNIT
41
223
CORRECTION VALUE UPDATE UNIT
222
PORT UNIT
32
CONNECTED TO SLAVE DEVICE 14
228
PACKET IDENTIFICATION UNIT
229
PORT UNIT
34
CONNECTED TO FOURTH WIRELESS RELAY DEVICE 24

COMMUNICATION SYSTEM 1000
GNSS SATELLITE
11
GNSS RECEIVER
12
MASTER DEVICE
13
31
FIRST WIRELESS RELAY DEVICE
21
FIRST TRANSMISSION PATH 91
41
SECOND WIRELESS RELAY DEVICE
22
32
SLAVE DEVICE
14
35
33
34
36
THIRD WIRELESS RELAY DEVICE
23
FOURTH WIRELESS RELAY DEVICE
24
42
SECOND TRANSMISSION PATH 92
FIFTH WIRELESS RELAY DEVICE
25
SIXTH WIRELESS RELAY DEVICE
26
43
THIRD TRANSMISSION PATH 93

COMMUNICATION SYSTEM, COMMUNICATION METHOD, AND COMMUNICATION PROGRAM

This application is based upon and claims the benefit of priority from Japanese Patent Application No. 2020-189940, filed on Nov. 16, 2021, the disclosure of which is incorporated herein in its entirety by reference.

TECHNICAL FIELD

The present invention relates to a communication system, a communication method, and a communication program.

BACKGROUND ART

Along with an increase in network traffic toward 5G, a larger capacity of communication processing being possible in a wireless relay device is required. Along with application of Ethernet (registered trademark) to a network, a request for time synchronization by a packet has also been surging.

In recent years, as a technique for performing time synchronization between communication devices, phase synchronization (e.g., IEEE 1588 or the like) by a packet has been drawing attention, in place of a conventional technique using GNSS or the like. Herein, GNSS is an abbreviation of a global navigation satellite system. IEEE is an abbreviation of Institute of Electrical and Electronics Engineers. IEEE 1588 defines PTP as a protocol for accurately synchronizing a time between communication devices within a network. Herein, PTP is an abbreviation of a precision time protocol.

Generally, a relay device that relays and transmits a PTP packet is placed between a master device being a transmission side communication device of a synchronization source of a time, and a slave device being a reception side communication device of a synchronization destination of a time. Herein, in a case of phase synchronization by a packet, a great fluctuation occurs in a transmission delay amount due to processing within the relay device. Accordingly, there is a transparent clock function as a function of reducing a fluctuation of a transmission delay during relay in a communication network of IEEE 1588 version 2.

In the transparent clock function, a master device sets, in a correction field of an overhead of a PTP packet being a time synchronization packet, a correction value being a value representing an elapsed time from delivery of the packet by the master device. In response to this, each wireless relay device being compliant with the transparent clock function subtracts a time (a count value or the like) at processing start of the wireless relay device from a correction value, and adds a time at processing end of the wireless relay device to the correction value. Then, a slave device performs a correction regarding an arrival delay amount from the master device to the slave device by use of a correction value within the PTP packet received from the master device.

Specific examples of a configuration and processing for updating a correction value of a time synchronization packet described above are disclosed in PTL 1.

On the other hand, a traffic bonding scheme is known as a method of sending a packet from a transmission side to a reception side, regardless of presence or absence of update of the correction value of the time synchronization packet described above (see PTL 2). In the traffic bonding scheme, a wireless communication system that performs data transmission via a plurality of wireless lines divides an input packet into a plurality of packets. Then, division packets are allocated to a plurality of bandwidth-controlled wireless lines, and data transmission with a plurality of bundled wireless lines is performed.

[PTL 1] International Publication No. WO2016/072038

[PTL 2] International Publication No. WO2014/174768

A communication system to which a traffic bonding scheme described in the paragraph BACKGROUND ART is applied has a problem in update of a correction value held by a time synchronization packet. In the communication system to which the traffic bonding scheme is applied, when a failure occurs in a wireless transmission path between primary devices, transmission and reception of the time synchronization packet are performed via a secondary device. Herein, the primary device refers to a wireless transmission device on a transmission side that performs division of a packet and allocation to the secondary device, and a wireless relay device on a reception side that performs assembly processing of a packet. The secondary device refers to a wireless relay device other than the primary device.

When an update method of a correction value in PTL 1 is applied as it is at transmission of a time synchronization packet via the secondary device, an error occurs in the correction value of the time synchronization packet. A reason for this is described in detail in description of an example embodiment.

SUMMARY

An object of the present invention is to provide a communication system and the like which are capable of updating a correction value of a time synchronization packet, and to which a traffic bonding scheme is applied.

A communication system according to the present invention includes: a communication processing unit that performs transmission of a packet from a wireless transmission device to a wireless reception device by a first transmission path and a second transmission path composed of one or more transmission paths, and reception of the packet by the wireless reception device; a line monitoring unit that determines presence or absence of communication in the first transmission path; and an information value update unit that adds, to an information value held by a storage packet being a predetermined packet, an actual measurement value of a first delay amount being a delay amount in a predetermined time unit representing a time required for the storage packet to be input to the wireless transmission device and then output from the wireless reception device, when a determination result according to the determination by the line monitoring unit is that the communication is present, or adds, to the information value, a set value of a second delay amount being the delay amount inside the wireless transmission device and the wireless reception device, when the determination result is that the communication is absent, wherein the communication processing unit performs the transmission and the reception by dividing the storage packet when a determination result according to the determination by the line monitoring unit is that the communication is present, or performs the transmission and the reception without dividing the storage packet when the determination result is that the communication is absent, the first transmission path is a wireless transmission path between the wireless transmission device and the wireless reception device, and the second transmission path is a transmission path going through a transmission side wireless relay device connected to the wireless transmission device, and a reception side wireless relay device that forms a second wireless transmission path between the transmission side wireless relay device and the reception side wireless relay device, and that is connected to the wireless reception device, and a set of the transmission side wireless relay device and the reception side wireless relay device adds, to the information value of the undivided storage packet, a second delay amount being the delay amount representing a time required for the storage packet to be sent to the transmission side wireless relay device and then sent out from the reception side wireless relay device.

A communication system to which a traffic bonding scheme is applied, according to the present invention, is capable of updating a correction value of a time synchronization packet.

BRIEF DESCRIPTION OF THE DRAWINGS

Exemplary features and advantages of the present invention will become apparent from the following detailed description when taken with the accompanying drawings in which:

FIG. 2 is a sequence chart (part 1) representing an operation example performed by the communication system according to the present example embodiment;

FIG. 3 is a sequence chart (part 2) representing an operation example performed by the communication system according to the present example embodiment;

FIG. 4 is a conceptual diagram representing a processing flow example of processing performed by a transmission side primary device according to the present example embodiment;

EXAMPLE EMBODIMENT

Next, a detailed explanation will be given for a first example embodiment with reference to the drawings.

In communication system according to the present example embodiment to which a traffic bonding scheme (see the paragraph BACKGROUND ART) is applied, a time synchronization packet (see the paragraph BACKGROUND ART) is divided and sent when a wireless transmission path between primary devices (see the paragraph BACKGROUND ART) is in communication. This prevents erroneous update of a correction value occurring when a time synchronization packet goes through a secondary device without being divided. When the wireless transmission path between the primary devices is not in communication, a time synchronization packet is made go through the secondary device without being divided, and update of a correction value in the secondary device is performed. In addition, a design value (set value) of a delay amount (an amount representing a delay time) occurring when the primary device is passed through is added to the correction value. Consequently, the communication system according to the present example embodiment to which the traffic bonding scheme is applied is capable of updating a correction value of a time synchronization packet.

Figure 1:
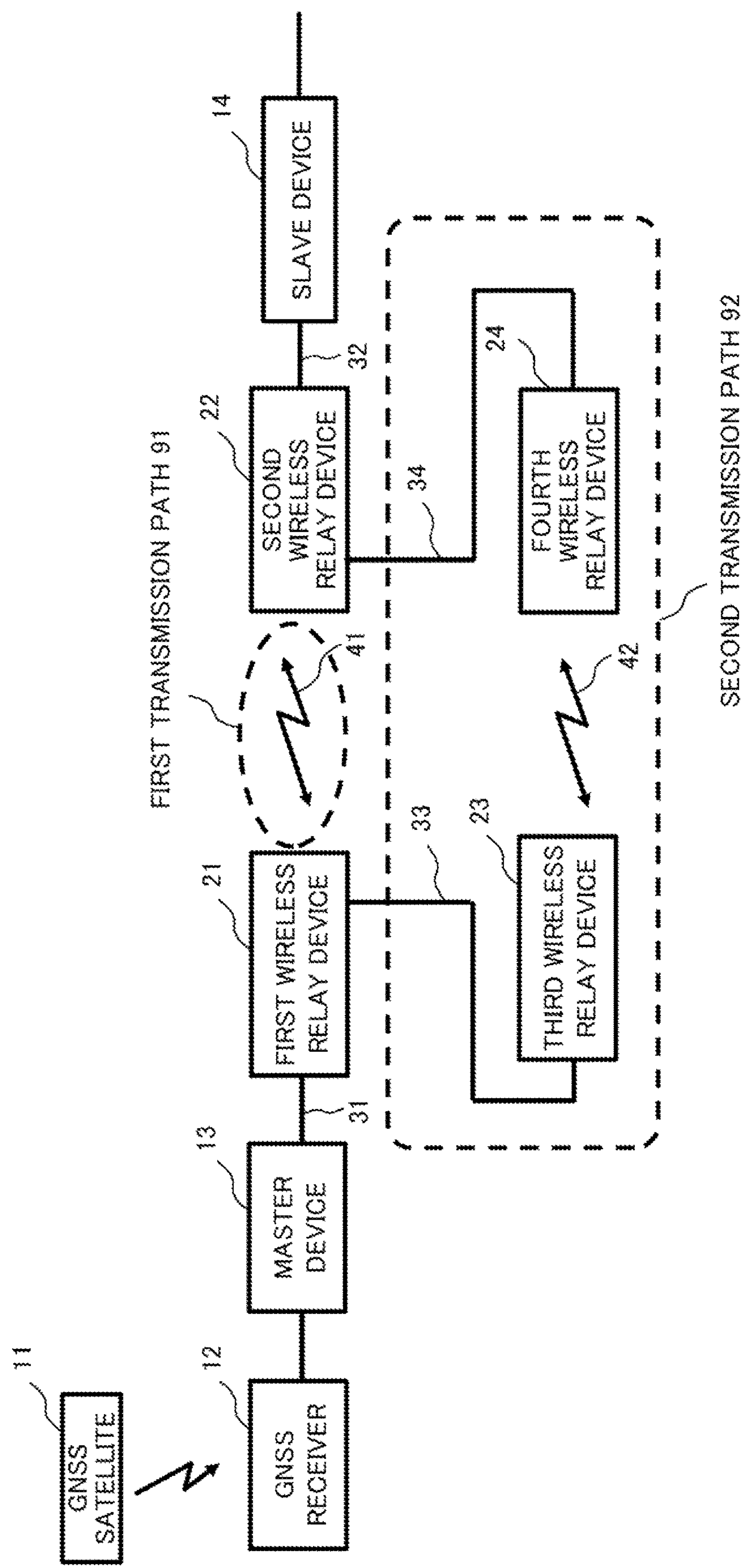
FIG. 1 is a conceptual diagram representing a configuration example (part 1) of a communication system according to the present example embodiment.

FIG. 1 is a conceptual diagram illustrating a configuration of a communication system 1000 being an example of a communication system according to the present example embodiment. The communication system 1000 includes a GNSS satellite 11, a GNSS receiver 12, a master device 13, a slave device 14, a first wireless relay device 21, a second wireless relay device 22, a third wireless relay device 23, and a fourth wireless relay device 24.

The communication system 1000 is a communication system of the previously described traffic bonding scheme. The first wireless relay device 21 and the second wireless relay device 22 are the previously described primary devices. The third wireless relay device 23 and the fourth wireless relay device 24 are the previously described secondary devices.

The GNSS receiver 12 is a receiver in a satellite navigation system, and receives a navigation signal from the GNSS satellite 11 or the like. The GNSS satellite 11 and the GNSS receiver 12 are publicly known, and, therefore, detailed description thereof is omitted.

The master device 13 is a communication device being compliant with a transparent clock function of IEEE 1588. The master device 13 is a synchronization source of a time when performing time synchronization with the slave device 14. The master device 13 is connected to the first wireless relay device 21 by a wired transmission path 31. The wired transmission path 31 is a transmission path by, for example, Ethernet (registered trademark).

The master device 13 periodically receives, from the GNSS receiver 12, a time, a timing pulse, a clock, or the like. Then, the master device 13 periodically transmits a time synchronization packet (e.g., a precision time protocol (PTP) packet) toward the slave device 14. Herein, as previously described, the time synchronization packet is a packet including a correction value for performing time synchronization in the slave device 14. A sum of a time in which a time synchronization packet stays in each relay device that performs relay of a time synchronization packet between the master device 13 and the slave device 14 is added to the correction value. When a time synchronization packet is, for example, a PTP packet, the correction value is set in a correction field of an overhead in the PTP packet.

The slave device 14 is a communication device being compliant with the transparent clock function of IEEE 1588. The slave device 14 is a synchronization destination of a time when performing time synchronization with the master device 13. The slave device 14 is connected to the second wireless relay device 22 by a wired transmission path 32. The wired transmission path 32 is a wired transmission path to which, for example, Ethernet (registered trademark) is applied.

Each of the first wireless relay device 21, the second wireless relay device 22, the third wireless relay device 23, and the fourth wireless relay device 24 is a wireless relay device being compliant with the traffic bonding scheme. Herein, in the traffic bonding scheme, an input transparent-clock-function-compliant packet is divided into a plurality of packets. Then, a division packet being a divided packet is allocated to each of a plurality of bandwidth-controlled wireless transmission paths, and transmission of each of the packets is performed. Herein, the transparent-clock-function-compliant packet is a packet being compliant with the transparent clock function of IEEE 1588.

The first wireless relay device 21 is connected to the third wireless relay device 23 via a wired transmission path 33. The second wireless relay device 22 is connected to the fourth wireless relay device 24 via a wired transmission path 34.

The first wireless relay device 21 sends a division packet to the second wireless relay device 22 by at least either of a first transmission path 91 and a second transmission path 92. Herein, the first transmission path 91 is a transmission path composed of a wireless transmission path 41. The second transmission path 92 is a transmission path composed of the wired transmission path 33, the third wireless relay device 23, a wireless transmission path 42, the fourth wireless relay device 24, and the wired transmission path 34.

The second wireless relay device 22 receives a division packet sent from the first wireless relay device 21 by either of the first transmission path 91 and the second transmission path 92. The second wireless relay device 22 bonds a plurality of received division packets, and generates a packet being relevant to a packet sent to the first wireless relay device 21 by the master device 13. The second wireless relay device 22 sends the generated packet to the slave device 14 through the wired transmission path 32.

The third wireless relay device 23 does not perform such division or allocation of a sent packet that the first wireless relay device 21 performs. The third wireless relay device 23 sends, to the fourth wireless relay device 24 through the wireless transmission path 42, a division packet sent from the first wireless relay device 21.

The fourth wireless relay device 24 does not perform such bonding of division packets that the second wireless relay device 22 performs. The fourth wireless relay device 24 receives, from the third wireless relay device 23, a division packet sent via the wireless transmission path 42, and sends the received division packet to the second wireless relay device 22.

In this way, the communication system 1000 performs communication between the master device 13 and the slave device 14 by going through a plurality of wireless relay devices and a plurality of wireless transmission paths. Thus, in the communication system 1000, even when a failure occurs in either of the wireless transmission paths 41 and 42, transmission of a packet from a transmission side to a reception side can be kept on by the other wireless transmission path.

However, what becomes a problem in such communication system 1000 is update of a correction value of a time synchronization packet described in the paragraph BACKGROUND ART. The time synchronization packet is a packet holding a correction value being a value representing an elapsed time after sent out from the master device 13. The correction value is updated by adding, in each wireless relay device through which a time synchronization packet goes, a stay time of the time synchronization packet in the wireless relay device.

The communication system 1000 is capable of updating a correction value by a method described in PTL 1, when a time synchronization packet is sent via the previously described first transmission path 91. However, when the method in PTL 1 is applied as it is, the following problem occurs in a case where a time synchronization packet is allocated to the previously described second transmission path 92.

Specifically, in this case, the following delay amount is added by processing performed in the first wireless relay device 21 and the second wireless relay device 22. In other words, in relation to a correction value, the delay amount is a delay amount between a timing at which a time synchronization packet is sent to the first wireless relay device 21 and a timing at which the time synchronization packet is sent out from the second wireless relay device 22. The delay amount (first delay amount) includes a delay amount (second delay amount) between a timing at which a time synchronization packet is sent to the third wireless relay device 23 and a timing at which the time synchronization packet is sent out from the fourth wireless relay device 24.

However, the second delay amount is further added to a correction value by processing performed in the third wireless relay device 23 and the fourth wireless relay device 24. Thus, a time synchronization packet sent out from the second wireless relay device 22 doubly includes the second delay amount, and an error occurs in the correction value.

In order to avoid occurrence of the problem, a time synchronization packet may be constantly allocated only to the previously described first transmission path 91. However, when a failure occurs in the first transmission path 91, the first transmission path 91 becomes unable to be utilized, and thereby sending of a time synchronization packet from the first wireless relay device 21 to the second wireless relay device 22 becomes unable to be performed.

Accordingly, the first wireless relay device 21 and the second wireless relay device 22 perform the following processing.

Specifically, when the first transmission path 91, i.e., the wireless transmission path 41 is in communication, the first wireless relay device 21 always divides a packet regardless of whether the packet is a time synchronization packet, and sends a divided packet to the second wireless relay device 22. Then, a combination of the first wireless relay device 21 and the second wireless relay device 22 performs update of a correction value regarding the time synchronization packets before division and after synthesis, by the method in PTL 1.

In this case, all packets passing through the third wireless relay device 23 and the fourth wireless relay device 24 are division packets. A division packet does not include, in a header portion thereof, information on a header of a packet before division. Therefore, a division packet of a time synchronization packet does not include, in a header thereof, an identifier representing that the division packet is a time synchronization packet. Thus, the third wireless relay device 23 and the fourth wireless relay device 24 do not identify a division packet of a time synchronization packet as a time synchronization packet. Hence, for the division packet, the third wireless relay device 23 and the fourth wireless relay device 24 do not add, to a correction value, a delay amount for the packet to be sent to the third wireless relay device 23 and then sent out from the fourth wireless relay device 24. This can avoid a problem, occurring when a time synchronization packet is not divided, that a delay amount for the packet to be sent to the third wireless relay device 23 and then sent out from the fourth wireless relay device 24 is doubly added to a correction value.

Then, update of a correction value is performed by a combination of the first wireless relay device 21 and the second wireless relay device 22, regarding an undivided time synchronization packet before division and after synthesis. Thus, whether a transmission path through which a division packet regarding the packet passes is the first transmission path 91 or the second transmission path 92 does not affect update of a correction value. Thus, a combination of the first wireless relay device 21 and the second wireless relay device 22 can perform update of a correction value even when the wireless transmission path 41 is in communication and a packet is allocated to each of the first transmission path 91 and the second transmission path 92.

On the other hand, when the first transmission path 91 composed of the wireless transmission path 41 is not in communication, the first wireless relay device 21 does not divide at least a time synchronization packet. A reason for this is to identify a time synchronization packet and perform update of a correction value in a set of the third wireless relay device 23 and the fourth wireless relay device 24, as described later. Then, a combination of the first wireless relay device 21 and the second wireless relay device 22 does not perform update of a correction value of a time synchronization packet by the method in PTL 1. Instead, each of the first wireless relay device 21 and the second wireless relay device 22 adds, to a time synchronization packet arriving at the wireless relay device itself, a design value (set value) of a delay amount required for the time synchronization packet to arrive at the wireless relay device itself and be then sent out.

The first wireless relay device 21 sends out a time synchronization packet to the second transmission path 92 without dividing the time synchronization packet, but the time synchronization packet that has been sent out stores, in a header thereof, an identifier indicating that the packet is a time synchronization packet. Thus, a combination of the third wireless relay device 23 and the fourth wireless relay device 24 identifies the packet as a time synchronization packet. Then, a combination of the third wireless relay device 23 and the fourth wireless relay device 24 adds, to a correction value, a delay amount for the packet to be sent to the third wireless relay device 23 and then sent out from the fourth wireless relay device 24, by the method in PTL 1.

Consequently, at a point where a time synchronization packet is sent out from the second wireless relay device 22 to the wired transmission path 32, a correction value thereof includes the following delay amount. Specifically, the delay amount is a total delay amount of a delay amount required for passing through inside of the first wireless relay device 21, a delay amount for the packet to be sent to the third wireless relay device 23 and then sent out from the fourth wireless relay device 24, and a delay amount required for passing through inside of the second wireless relay device 22. The total delay amount does not include a delay amount when a time synchronization packet passes through each of the wired transmission paths 33 and 34. However, it is considered that a delay amount when a time synchronization packet passes through each of the wired transmission paths 33 and 34 is sufficiently short and can be neglected. Therefore, a total delay amount is substantially equal to a delay amount required for a time synchronization packet to arrive at the first wireless relay device 21 from the wired transmission path 31 and be then sent out from the second wireless relay device 22 to the wired transmission path 32, that is when the time synchronization packet passes through the second transmission path 92.

In this way, a combination of the first wireless relay device 21 and the second wireless relay device 22 can perform update of a correction value of a time synchronization packet regardless of presence or absence of communication in the wireless transmission path 41 being the first transmission path 91.

FIG. 2 is a sequence chart representing an operation performed in the communication system 1000 in FIG. 1 for a time synchronization packet when the wireless transmission path 41 is in communication.

When a time synchronization packet is sent from the master device 13, the first wireless relay device 21 updates a correction value of the time synchronization packet, as an operation of A1. The first wireless relay device 21 performs the update by the method disclosed in PTL 1. A specific example of a method of the update is described later.

Then, the first wireless relay device 21 divides the time synchronization packet, as an operation of A2. The division is performed in order that a packet may not be recognized as a time synchronization packet in each of the third wireless relay device 23 and the fourth wireless relay device 24 when the packet goes through the second transmission path 92, as previously described. Thus, the number of division packets acquired by the division is any number. A specific example of a method of the division is described later.

Then, the first wireless relay device 21 allocates a division packet to each of the first transmission path 91 and the second transmission path 92 in FIG. 1, as an operation of A3.

The division packet allocated to the first transmission path 91 is sent to the second wireless relay device 22 without going through the third wireless relay device 23 and the fourth wireless relay device 24.

On the other hand, the division packet allocated to the second transmission path 92 is first sent to the third wireless relay device 23. The third wireless relay device 23 transfers the division packet to the fourth wireless relay device 24, as an operation of A4. In this instance, as previously described, since the packet is a division packet, update of a correction value is not performed. The fourth wireless relay device 24 transfers, to the second wireless relay device 22, the division packet sent from the third wireless relay device 23, as an operation of A5. In this instance as well, as previously described, since the packet is a division packet, update of a correction value is not performed.

The second wireless relay device 22 performs assembly for a division packet sent from the fourth wireless relay device 24, as an operation of A6. Then, as an operation of A7, the second wireless relay device 22 performs update of a correction value for a time synchronization packet after assembly, by the method in PTL 1.

FIG. 3 is a sequence chart representing an operation performed in the communication system 1000 in FIG. 1 for a time synchronization packet when the wireless transmission path 41 is not in communication.

When a time synchronization packet is sent from the master device 13, the first wireless relay device 21 updates a correction value of the time synchronization packet, as an operation of B1. The first wireless relay device 21 performs the update not by the method disclosed in PTL 1 but by adding, to a correction value, a delay amount required for a time synchronization packet to pass through the first wireless relay device 21, as previously described.

Then, the first wireless relay device 21 sends out the time synchronization packet to the second transmission path 92 without dividing the time synchronization packet, as an operation of B2.

The undivided time synchronization packet sent out to the second transmission path 92 is first sent to the third wireless relay device 23. As an operation of B3, after updating a correction value of a time synchronization packet by the method in PTL 1, the third wireless relay device 23 transfers the time synchronization packet to the fourth wireless relay device 24. The time synchronization packet is not divided, and therefore stores, in a header thereof, identification information representing that the packet is a time synchronization packet. Thus, the third wireless relay device 23 recognizes by the identification information that the packet is a time synchronization packet, and updates a correction value thereof.

Then, as an operation of B4, after updating a correction value of a time synchronization packet by the method disclosed in PTL 1, the fourth wireless relay device 24 transfers the time synchronization packet to the second wireless relay device 22. The time synchronization packet is not divided, and therefore stores, in a header thereof, identification information representing that the packet is a time synchronization packet. Thus, the fourth wireless relay device 24 recognizes by the identification information that the packet is a time synchronization packet, and updates a correction value thereof.

The second wireless relay device 22 performs update of a correction value for an undivided time synchronization packet sent from the fourth wireless relay device 24, as an operation of B5. The second wireless relay device 22 performs the update not by the method disclosed in PTL 1 but by adding, to a correction value, a delay amount required for a time synchronization packet to pass through the second wireless relay device 22, as previously described.

A combination of the first wireless relay device 21 and the second wireless relay device 22 performs update processing of a correction value according to the present example embodiment described above, for example, by a processing flow example and a configuration example described below.

FIG. 4 is a conceptual diagram representing a processing flow example of processing performed by the first wireless relay device 21. The first wireless relay device 21 starts processing in FIG. 4, for example, by input of start information from outside.

Then, the first wireless relay device 21 first performs, as processing in S11, determination regarding whether a packet sent from the wired transmission path 31 is received. When a determination result by the processing in S11 is yes, the first wireless relay device 21 performs processing in S12. On the other hand, when a determination result by the processing in S11 is no, the first wireless relay device 21 again performs the processing in S11, and waits for a packet to reach.

When performing the processing in S12, the first wireless relay device 21 performs, as the processing, determination regarding whether the wireless transmission path 41 is in communication. Regardless of transmission or reception of a packet, the first wireless relay device 21 performs transmission and reception of a frame including information on a modulation scheme and the like in a header portion to and from the second wireless relay device 22 via the wireless transmission path 41. Then, the first wireless relay device 21 determines that the wireless transmission path 41 is not in communication when a loss of frame (LOF) or the like in which a reception level of a wireless signal decreases or synchronization becomes unable to be performed in a wireless section occurs, or determines that the wireless transmission path 41 is in communication otherwise.

When a determination result by the processing in S12 is yes, the first wireless relay device 21 performs processing in S13. On the other hand, when a determination result by the processing in S12 is no, the first wireless relay device 21 performs processing in S17.

When performing the processing in S13, the first wireless relay device 21 determines, as the processing, whether the packet determining that the packet is sent by the processing in S11 is a time synchronization packet. The time synchronization packet stores, in a header thereof, an identifier representing that the packet is a time synchronization packet. The first wireless relay device 21 determines, by the identifier, whether the sent packet is a time synchronization packet. When a determination result by the processing in S13 is yes, the first wireless relay device 21 performs processing in S14. On the other hand, when a determination result by the processing in S13 is no, the first wireless relay device 21 skips the processing in S14, and performs processing in S15.

When performing the processing in S14, the first wireless relay device 21 subtracts, as the processing, a count value of a clock signal at a point of being input, from a correction value of the time synchronization packet. Herein, it is assumed that a correction value is represented by a count value of a clock of a clock signal. It is also assumed that the first wireless relay device 21 includes therein a counter that counts the number of clocks of a clock signal. A configuration for performing such processing is disclosed in PTL 1. The processing in S14 is processing performed on the first wireless relay device 21 side by the method in PTL 1 in order to add the following delay amount to a correction value of a time synchronization packet. Specifically, the delay amount is a delay amount for the time synchronization packet to be input to the first wireless relay device 21 and then sent out from the second wireless relay device 22 in FIG. 1. Processing performed on the second wireless relay device 22 side for the addition is described later.

Next, the first wireless relay device 21 performs division of a packet, as the processing in S15. The first wireless relay device 21 always performs the division regardless of whether a packet is a time synchronization packet. A reason that the division is always performed for a time synchronization packet as well is that the third wireless relay device 23 and the fourth wireless relay device 24 do not recognize a packet as a time synchronization packet when a time synchronization packet passes through the second transmission path 92 in FIG. 1, as previously described. A division packet does not include, in a header portion thereof, an identifier representing that the packet is a time synchronization packet. Thus, the third wireless relay device 23 and the fourth wireless relay device 24 do not recognize a division packet of a time synchronization packet as a time synchronization packet. Hence, for the division packet, the third wireless relay device 23 and the fourth wireless relay device 24 do not add, to a correction value, a delay amount for the packet to be sent to the third wireless relay device 23 and then sent out from the fourth wireless relay device 24. This can avoid a problem, occurring when a time synchronization packet is not divided, that a delay amount for the packet to be sent to the third wireless relay device 23 and then sent out from the fourth wireless relay device 24 is doubly added to a correction value.

Then, the first wireless relay device 21 allocates and sends out a division packet to each of the wireless transmission path 41 and the wired transmission path 33, as processing in S16. The division packet sent to the wireless transmission path 41 arrives at and is received by the second wireless relay device 22 via the first transmission path 91 composed of the wireless transmission path 41. The division packet sent out to the wired transmission path 33 arrives at and is received by the second wireless relay device 22 via the second transmission path 92.

When performing the processing in S17, the first wireless relay device 21 performs, as the processing, determination regarding whether the packet determined to have arrived by the processing in S11 is a time synchronization packet. A method of the determination is similar to that in a case of the processing in S13. When a processing result by the processing in S17 is yes, the first wireless relay device 21 performs processing in S18. On the other hand, when a processing result by the processing in S17 is no, the first wireless relay device 21 skips the processing in S18, and performs processing in S19.

When performing the processing in S18, the first wireless relay device 21 adds, as the processing, a previously stored delay amount to a correction value of a time synchronization packet. The delay amount is a time required for the time synchronization packet to be sent from the wired transmission path 31 to the first wireless relay device 21 and then sent out to the wired transmission path 33, and is a design value (set value) previously determined at designing of the first wireless relay device 21.

Then, the first wireless relay device 21 sends out a packet determined to have arrived by the processing in S11, to the wired transmission path 33 without dividing the packet, as the processing in S19. However, the first wireless relay device 21 may send out a packet other than a time synchronization packet to the wired transmission path 33 after dividing the packet. A time synchronization packet may not be divided.

The packet sent out to the wired transmission path 33 arrives at the second wireless relay device 22 via the second transmission path 92 in FIG. 1. In this instance, when the packet is a time synchronization packet, the third wireless relay device 23 and the fourth wireless relay device 24 adds, to a correction value, a delay amount for the packet to arrive at the third wireless relay device 23 and be then sent out from the fourth wireless relay device 24. This is because a time synchronization packet arrives at the third wireless relay device 23 and the fourth wireless relay device 24 without being divided, and, therefore, the devices each recognize, from an identifier in a header, that a packet is a time synchronization packet, and performs update processing of a correction value.

The update processing of a correction value by the third wireless relay device 23 and the fourth wireless relay device 24 is performed by the method in PTL 1. Specifically, the update processing is performed in such a way that the third wireless relay device 23 subtracts, from a correction value, a count value of a clock signal representing a time at which the packet arrives, and the fourth wireless relay device 24 adds, to the correction value, a count value representing a time at which the packet is sent out. A count value in the third wireless relay device 23 and a count value in the fourth wireless relay device 24 are equal values at the same time, for example, by the method disclosed in PTL 1. Thus, a delay amount is added to a correction value by the operation described above, in a time unit (a unit representing time) being a count value of a clock signal counted from arrival of a packet at the third wireless relay device 23 up to sending out from the fourth wireless relay device 24.

Consequently, when the wireless transmission path 41 is not in communication, the following delay amount is added to a correction value of a time synchronization packet arriving at the second wireless relay device 22. Specifically, the delay amount is a total of a design value (set value) of a delay amount required for a time synchronization packet to pass through the first wireless relay device 21, and an actual measurement value of a delay amount for the time synchronization packet to arrive at the third wireless relay device 23 and be then sent out from the fourth wireless relay device 24. A delay amount when a time synchronization packet passes through the wired transmission paths 33 and 34 is not added to a correction value. However, it is considered that a delay amount when a time synchronization packet passes through the wired transmission paths 33 and 34 is sufficiently short and can be neglected.

Figure 5:
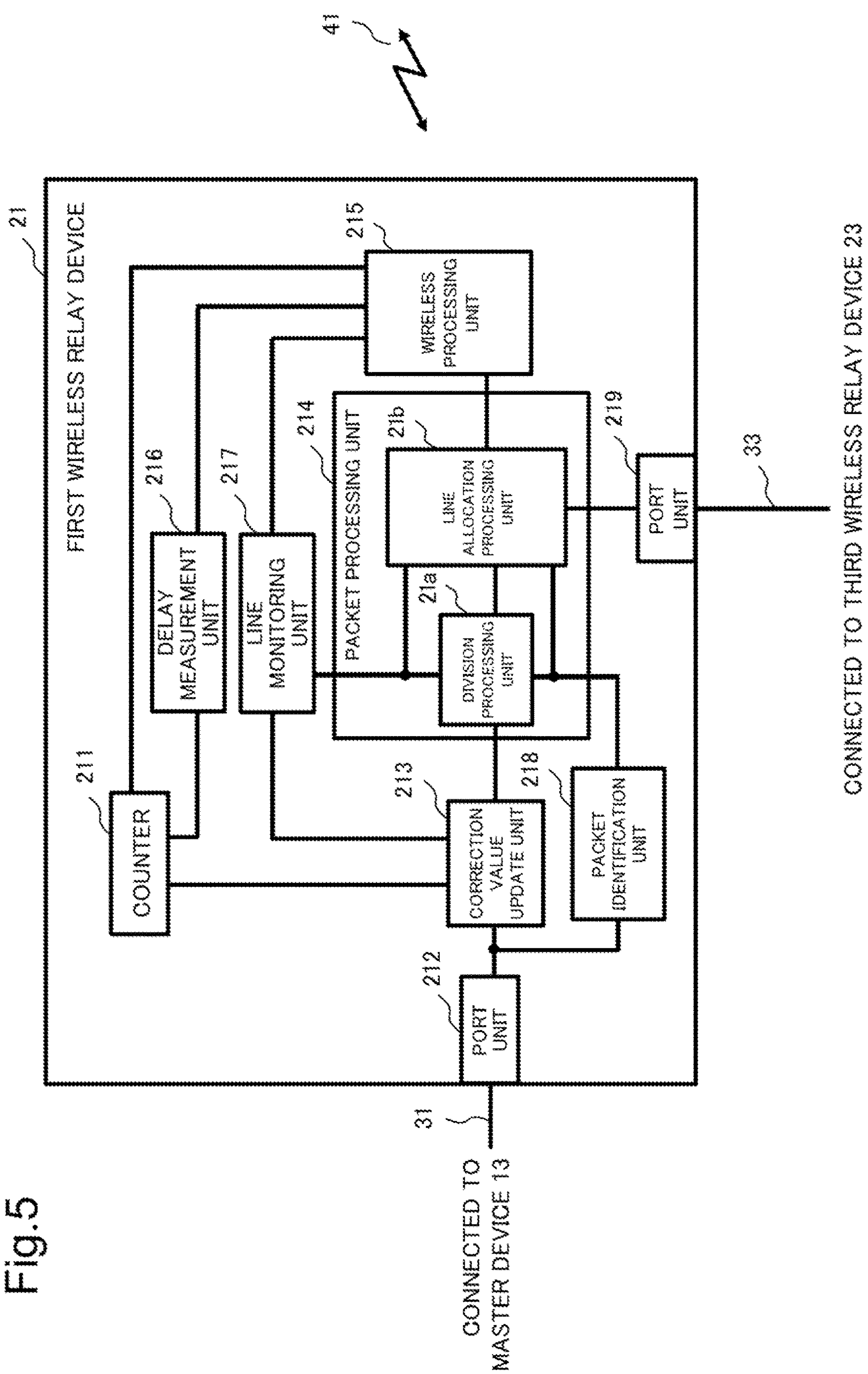
FIG. 5 is a conceptual diagram representing a configuration example of the transmission side primary device according to the present example embodiment.

FIG. 5 is a conceptual diagram representing a configuration example of the first wireless relay device 21, illustrated in FIG. 1, that performs the processing in FIG. 2. The first wireless relay device 21 includes a counter 211, a port unit 212, a correction value update unit 213, a packet processing unit 214, a wireless processing unit 215, a delay measurement unit 216, a line monitoring unit 217, a packet identification unit 218, and a port unit 219. The packet processing unit 214 includes a division processing unit 21*a* and a line allocation processing unit 21*b*.

Among these components, the counter 211, the port unit 212, the correction value update unit 213, the packet processing unit 214, the wireless processing unit 215, and the delay measurement unit 216 are components illustrated in FIG. 3 of PTL 1, and performs an operation similar to that illustrated in FIG. 3 of PTL 1.

In other words, an operation performed by the counter 211 is similar to a counter 211 in FIG. 3 of PTL 1. The counter 211 adds, by one, a count value at a count interval adjusted according to detection of a frame pulse included in a wireless frame, and clears the count value to 0 when the count value comes to an upper limit value. It is assumed that an interval (upper limit value) at which a count value is cleared is a sufficiently long time as compared with a total processing delay amount of two wireless relay devices, in order to avoid clearance of a count value during wireless communication. The counter 211 may adjust a clearance interval of a count value according to detection of a frame pulse.

Various kinds of data including a time synchronization packet arriving from the master device 13 via the wired transmission path 31 are sent from the port unit 212 to the correction value update unit 213 and the packet identification unit 218.

The correction value update unit 213 performs identification of a time synchronization packet for a packet input from the port unit 212 by packet identification information acquired from the packet identification unit 218. Update of a correction value described below is performed for a time synchronization packet. Regarding a packet other than a time synchronization packet, processing of updating a correction value is not performed, and the packet is output to the packet processing unit 214.

When most recent line information sent from the line monitoring unit 217 represents that the wireless transmission path 41 is in communication, the correction value update unit 213 performs update of a correction value by an operation similar to that of a correction value update unit 213 in FIG. 3 of PTL 1. In other words, the correction value update unit 213 acquires, from the counter 211, a count value at a point where input of a time synchronization packet is accepted from the port unit 212. Then, the correction value update unit 213 extracts a correction value from an overhead of a time synchronization packet, and subtracts the count value from the correction value. Then, the correction value update unit 213 replaces the correction value before subtraction within the overhead with a correction value after subtraction, and sends a time synchronization packet to the packet processing unit 214.

When most recent information sent from the line monitoring unit 217 represents, according to line information, that the wireless transmission path 41 is not in communication, the correction value update unit 213 updates a correction value by an operation that is not described in PTL 1. Specifically, the correction value update unit 213 extracts a correction value from an overhead of a time synchronization packet, and adds a design value (set value) of a previously calculated internal processing delay amount to the correction value. The internal processing delay amount is a design value (set value) of an internal processing delay amount for a time synchronization packet to be transferred from the port unit 212 to the port unit 219. Then, the correction value update unit 213 replaces the correction value within the overhead with a correction value after addition of the internal processing delay amount, and outputs a time synchronization packet to the packet processing unit 214.

The packet processing unit 214 performs packet processing for a packet including a time synchronization packet sent from the correction value update unit 213, and sends the packet to the wireless processing unit 215 and the port unit 219. Herein, the packet processing includes division processing of a packet and allocation processing to a plurality of bandwidth-controlled wireless transmission paths, for performing traffic bonding, and is performed by the division processing unit 21*a* and the line allocation processing unit 21*b*.

The division processing unit 21*a* performs division processing for a packet including a time synchronization packet sent from the correction value update unit 213, and sends a division packet to the line allocation processing unit 21*b*. The division processing is performed by packet identification information acquired from the packet identification unit 218 and line information acquired from the line monitoring unit 217. The division processing unit 21*a* gives the division packet an overhead used in assembly processing performed in the second wireless relay device 22.

The line allocation processing unit 21*b* performs allocation processing of sending out a division packet sent from the division processing unit 21*a* to either of the wireless processing unit 215 and the port unit 219, by packet identification information acquired from the packet identification unit 218 and line information acquired from the line monitoring unit 217. A content of the allocation processing is described later.

A content of an operation of the wireless processing unit 215 is similar to that of an operation performed by a wireless processing unit 215 in FIG. 3 of PTL 1. Specifically, the wireless processing unit 215 generates, as a wireless frame, each piece of various kinds of data to be sent to the second wireless relay device 22. Then, the wireless processing unit 215 transmits the generated wireless frame to the second wireless relay device 22 via the wireless transmission path 41. Herein, in generation of a wireless frame, the wireless processing unit 215 sets a frame pulse for performing synchronization of a count interval in an overhead of the wireless frame. Herein, a frame pulse is a synchronization pulse for synchronizing count intervals of the counter 211 included in the first wireless relay device 21 and a counter 221 (see FIG. 7) included in the second wireless relay device 22. When calculating a transmission delay amount between the first wireless relay device 21 and the second wireless relay device 22, the wireless processing unit 215 sets a delay measurement pulse for measuring a round trip delay (RTD) in an overhead of a wireless frame. Further, when synchronizing clearance timings of the counter 211 and the counter 221, the wireless processing unit 215 sets a clearance flag to an overhead of a wireless frame. The wireless processing unit 215 sets a delay measurement pulse and a clearance flag according to an instruction from the delay measurement unit 216.

The wireless processing unit 215 also receives a wireless frame from the second wireless relay device 22 via the wireless transmission path 41, and performs an analysis and the like regarding the received wireless frame. The wireless processing unit 215 detects, for example, a frame pulse, a delay measurement pulse, and a return processing time dt from an overhead of the received wireless frame. When detecting a frame pulse, the wireless processing unit 215 notifies the counter 211, and causes the counter 211 to adjust a count interval thereof. When detecting a delay measurement pulse and the return processing time dt, the wireless processing unit 215 notifies the delay measurement unit 216. Details of the present operation are described in PTL 1, and, herein, description of a concept of a synchronization pulse and a delay measurement pulse included in a wireless frame is omitted.

An operation performed by the delay measurement unit 216 is similar to an operation performed by a delay measurement unit 216 in FIG. 3 of PTL 1. Specifically, when calculating a transmission delay amount occurring between the first wireless relay device 21 and the second wireless relay device 22, the delay measurement unit 216 instructs the wireless processing unit 215 to set a delay measurement pulse (first pulse). Then, the delay measurement unit 216 acquires, from the counter 211, a count value at a point of instructing to set a delay measurement pulse, and holds the acquired count value.

When accepting, from the wireless processing unit 215, a notification that a delay measurement pulse (second pulse) is detected, the delay measurement unit 216 acquires a count value at the point from the counter 211, and holds the acquired count value. The delay measurement unit 216 measures, as an RTD, a difference between a setting time of the first pulse and a detection time of the second pulse.

When accepting, from the wireless processing unit 215, a notification of the return processing time dt, the delay measurement unit 216 calculates a transmission delay amount by an equation (1) in PTL 1. Then, the delay measurement unit 216 performs a correction relating to a timing of clearing a count value of the counter 211. The delay measurement unit 216 delays, as much as the calculated transmission delay amount, a timing of clearing a count value of the counter 211. For example, the delay measurement unit 216 prevents clearance at a clearance timing of a count value of the counter 211, and instructs the wireless processing unit 215 to transmit a wireless frame including a clearance flag to the second wireless relay device 22. Then, the delay measurement unit 216 clears a count value of the counter 211 to 0 after elapse of a transmission delay amount from the instruction to transmit the clearance flag.

The line monitoring unit 217 is a component that is not described in PTL 1. The line monitoring unit 217 monitors whether the wireless transmission path 41 between the first wireless relay device 21 and the second wireless relay device 22 is in communication, and sends the previously described line information being information including the monitoring result to the packet processing unit 214 and the correction value update unit 213.

The packet identification unit 218 is a component that is not described in PTL 1. The packet identification unit 218 performs identification of a time synchronization packet for a packet input from the port unit 212, and sends packet identification information to the correction value update unit 213 and the packet processing unit 214.

The port unit 219 is a component that is not described in PTL 1. A packet sent from the packet processing unit 214 is sent out from the port unit 219 to the third wireless relay device 23 via the wired transmission path 33.

Figure 6:
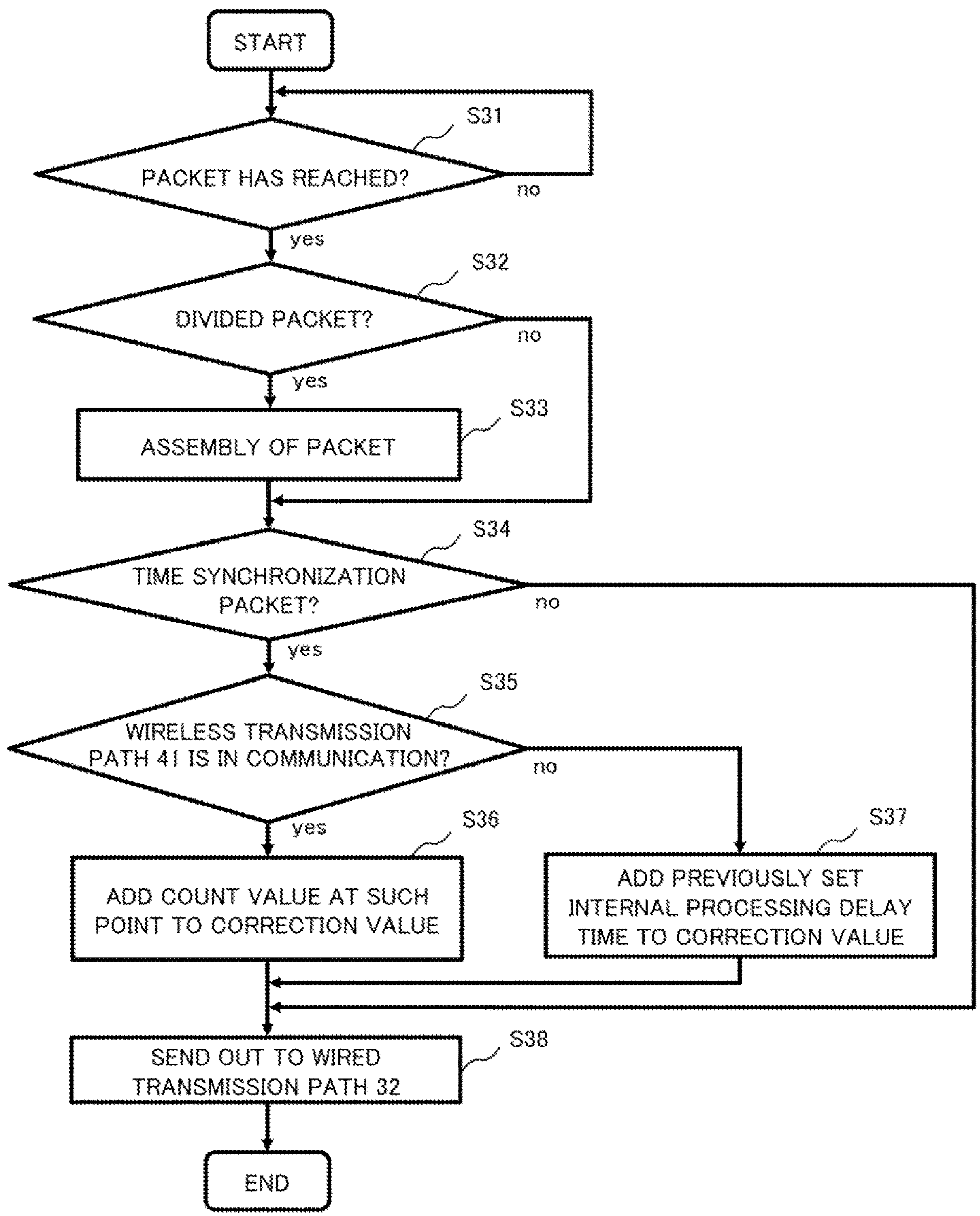
FIG. 6 is a conceptual diagram representing a processing flow example of processing performed by a reception side primary device according to the present example embodiment.

FIG. 6 is a conceptual diagram representing a processing flow example of processing performed by the second wireless relay device 22 in FIG. 1.

The second wireless relay device 22 starts processing in FIG. 6, for example, by input of a start signal from outside. The second wireless relay device 22 first performs, as processing in S31, determination regarding whether a packet sent from either of the wireless transmission path 41 and the wired transmission path 34 in FIG. 1 is received. When a determination result by the processing in S31 is yes, the second wireless relay device 22 performs processing in S32. On the other hand, when a determination result by the processing in S31 is no, the second wireless relay device 22 again performs the processing in S31, and waits for a packet to reach.

When performing the processing in S32, the second wireless relay device 22 performs, as the processing, determination regarding whether the sent packet is a division packet. When a determination result by the processing in S32 is yes, the second wireless relay device 22 performs processing in S33. On the other hand, when a determination result by the processing in S32 is no, the second wireless relay device 22 skips the processing in S33, and performs processing in S34.

When performing the processing in S33, the second wireless relay device 22 performs assembly of a division packet as the processing.

Then, the second wireless relay device 22 performs, as the processing in S34, determination regarding whether a packet is a time synchronization packet. The determination method is as described in the description in S13 of FIG. 4. When a determination result by the processing in S34 is yes, the second wireless relay device 22 performs processing in S35. On the other hand, when a determination result by the processing in S34 is no, the second wireless relay device 22 performs processing in S38.

When performing the processing in S35, the second wireless relay device 22 performs, as the processing, determination regarding whether the wireless transmission path 41 is in communication. The determination method is as described in the description in S12 of FIG. 4. When a determination result by the processing in S35 is yes, the second wireless relay device 22 performs processing in S36. On the other hand, when a determination result by the processing in S35 is no, the second wireless relay device 22 performs processing in S37.

When performing processing in S36, the second wireless relay device 22 adds, as the processing, a count value at the point to a correction value. Similarly to the first wireless relay device 21, the second wireless relay device 22 includes therein a counter that counts the number of clocks of a clock signal. The processing in S36 is processing performed on the first wireless relay device 21 side in order to add the following delay amount to a correction value of a time synchronization packet by the method in PTL 1. Specifically, the delay amount is a delay amount for the time synchronization packet to be input to the first wireless relay device 21 and then sent out from the second wireless relay device 22. Details of the processing are described later. Then, the second wireless relay device 22 performs the processing in S38.

When performing processing in S37, the second wireless relay device 22 adds, as the processing, a previously set delay amount to a correction value. The delay amount is a design value (set value) of a delay amount required for a time synchronization packet to be input from the wired transmission path 34 and then sent out to the wired transmission path 32. Then, the second wireless relay device 22 performs the processing in S38.

When performing the processing in S38, the second wireless relay device 22 sends, as the processing, a packet to the wired transmission path 32. The sent packet arrives at the slave device 14.

Figure 7:
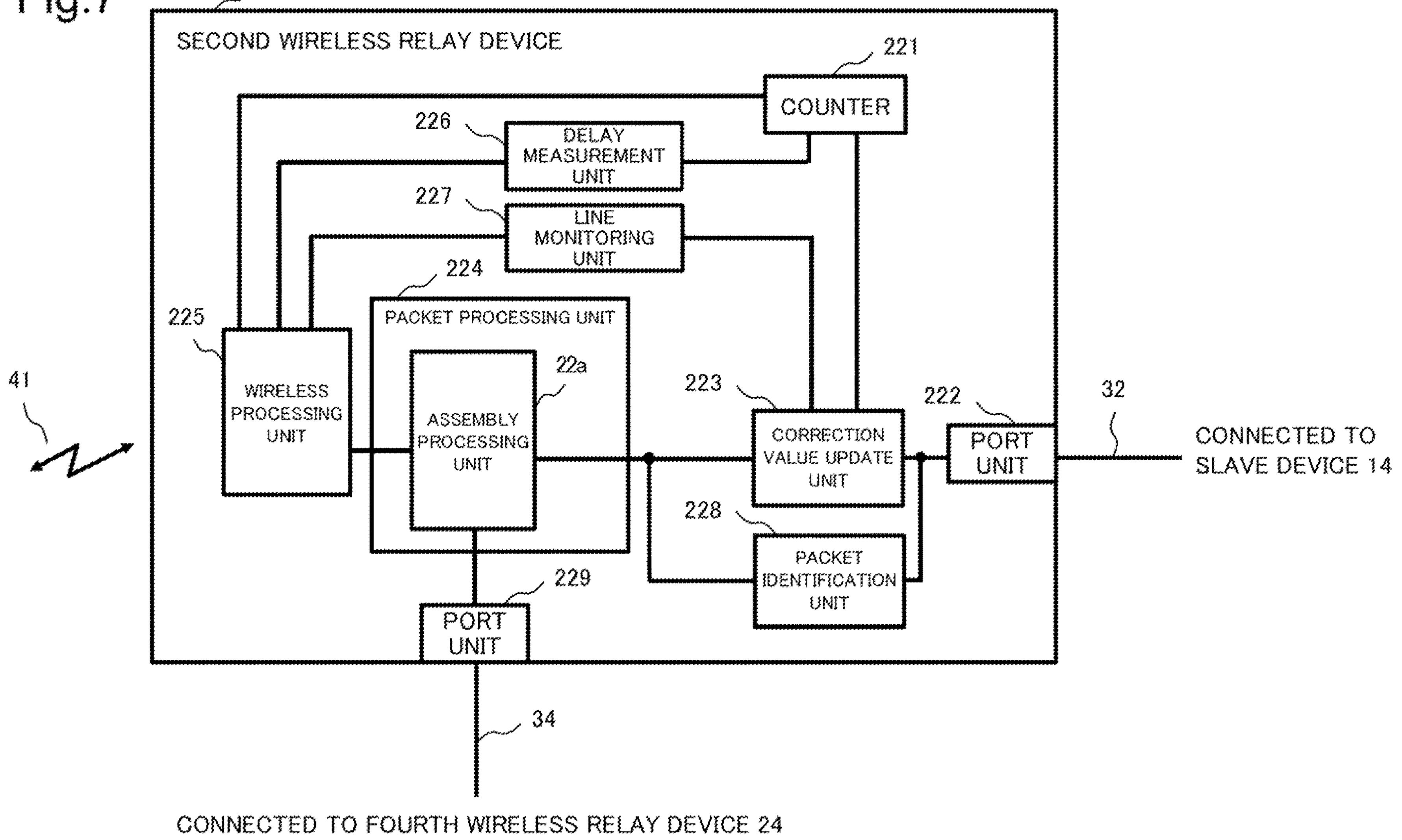
FIG. 7 is a conceptual diagram representing a configuration example of the reception side primary device according to the present example embodiment.

FIG. 7 is a conceptual diagram representing a specific example of the second wireless relay device 22 that performs processing represented in FIG. 6. The second wireless relay device 22 includes a counter 221, a port unit 222, a correction value update unit 223, a packet processing unit 224, a wireless processing unit 225, a delay measurement unit 226, a line monitoring unit 227, a packet identification unit 228, and a port unit 229. The packet processing unit 224 is composed of an assembly processing unit **22*a***.

An operation performed by the counter 221 is similar to an operation performed by a counter 221 in FIG. 3 of PTL 1. In other words, similarly to the counter 211 in FIG. 5, the counter 221 adds, by one, a count value at a count interval adjusted according to detection of a frame pulse, and clears the count value to 0 when the count value comes to an upper limit value. The counter 221 also clears the count value to 0 when accepting a notification of detection of a clearance flag from the wireless processing unit 225.

An operation performed by the wireless processing unit 225 is similar to an operation performed by a wireless processing unit 225 in FIG. 3 of PTL 1. In other words, the wireless processing unit 225 receives a wireless frame from the first wireless relay device 21 via the wireless transmission path 41, and performs an analysis and the like regarding the received wireless frame. The wireless processing unit 225 detects, for example, a frame pulse, a delay measurement pulse, and a clearance flag from an overhead of the received wireless frame. When detecting a frame pulse, the wireless processing unit 225 notifies the counter 221, and causes the counter 221 to adjust a count interval thereof. Particularly, since a frame pulse is constantly included in a wireless frame, the counter 211 and the counter 221 are synchronized in count interval.

When detecting a delay measurement pulse, the wireless processing unit 225 notifies the delay measurement unit 226. Further, when detecting a clearance flag, the wireless processing unit 225 clears a count value of the counter 221.

The wireless processing unit 225 outputs, to the packet processing unit 224, a time synchronization packet and the like extracted from a payload of a wireless frame.

The wireless processing unit 225 sets a delay measurement pulse and the return processing time dt, according to an instruction from the delay measurement unit 226, in an overhead of a wireless frame.

An operation performed by the delay measurement unit 226 is similar to an operation performed by a delay measurement unit 226 in FIG. 3 of PTL 1. In other words, when accepting, from the wireless processing unit 225, a notification that a delay measurement pulse (first pulse) is detected, the delay measurement unit 226 acquires a count value at the point from the counter 221, and holds the count value. Then, in response to the notification that the first pulse is detected, the delay measurement unit 226 instructs the wireless processing unit 225 to set a delay measurement pulse (second pulse). Then, the delay measurement unit 226 acquires, from the counter 221, a count value at the point of instructing to set a delay measurement pulse, and holds the count value. Then, the delay measurement unit 226 measures, as the return processing time dt, a difference between a detection time of the first pulse and a setting time of the second pulse. Thereafter, the delay measurement unit 226 outputs the measured return processing time dt to the wireless processing unit 225, and performs instruction to notify the first wireless relay device 21.

A packet sent from the fourth wireless relay device 24 via the wired transmission path 34 is sent from the port unit 229 to the assembly processing unit 22*a* of the packet processing unit 224.

An operation performed by the packet processing unit 224 includes an operation other than an operation performed by a packet processing unit 224 in FIG. 3 of PTL 1. The packet processing unit 224 performs packet reception processing for a packet sent from the wireless processing unit 225 and the port unit 229, and outputs the processed packet to the correction value update unit 223. Herein, the packet reception processing includes assembly processing of a packet in the assembly processing unit 22*a* for performing traffic bonding.

The assembly processing unit 22*a* is a component that is not included in the packet processing unit 224 in FIG. 3 of PTL 1. The assembly processing unit 22*a* performs assembly processing of a packet for each of divided packets sent from the wireless processing unit 225 and the port unit 229, based on an overhead for assembly processing given by the division processing unit 21*a*, and sends the assembled packet to the correction value update unit 223.

An operation performed by the correction value update unit 223 includes an operation other than an operation performed by a correction value update unit 223 in FIG. 3 of PTL 1. The correction value update unit 223 performs identification of a time synchronization packet by packet identification information acquired from the packet identification unit 228 for a time synchronization packet input from the assembly processing unit 22*a*. The correction value update unit 223 performs, for the time synchronization packet, update of a correction value by a count value acquired from the counter 221 and line information acquired from the line monitoring unit 227. Regarding a packet other than a time synchronization packet, the correction value update unit 223 does not perform correction value update processing, and sends out the packet to the port unit 222. The operation so far performed by the correction value update unit 223 is the same as an operation performed by the correction value update unit 223 in FIG. 3 of PTL 1.

The following operation performed by the correction value update unit 223 is different from operation performed by the correction value update unit 223 in FIG. 3 of PTL 1. In other words, only when determining, by line information sent from the line monitoring unit 227, that the wireless transmission path 41 is in communication, the correction value update unit 223 acquires, from the counter 221, a count value at a point where input of a time synchronization packet is accepted from the assembly processing unit 22*a*. Then, the correction value update unit 223 extracts a correction value from an overhead of a time synchronization packet, and adds the count value to the correction value. Then, the correction value update unit 223 replaces a correction value before addition within the overhead with a correction value after addition. Then, the correction value update unit 223 outputs a time synchronization packet including a correction value after addition to the port unit 222.

When determining, by line information sent from the line monitoring unit 227, that the wireless transmission path 41 is not in communication, the correction value update unit 223 extracts a correction value from an overhead of a time synchronization packet, and adds a previously calculated internal processing delay amount to the correction value. The internal processing delay amount is a design value (set value) of an internal processing delay amount for a time synchronization packet to be transferred from the port unit 229 to the port unit 222. Then, the correction value update unit 223 replaces the correction value within the overhead with a correction value after addition of the internal processing delay amount, and outputs a time synchronization packet to the port unit 222.

A packet including a time synchronization packet accepted from the correction value update unit 223 is transmitted from the port unit 222 to the slave device 14 via the wired transmission path 32.

A configuration example of each of the third wireless relay device 23 and the fourth wireless relay device 24 in FIG. 1 is similar to a configuration of each of a first wireless relay device 21 and a second wireless relay device 22 in FIG. 3 of PTL 1.

The above description describes an example of a case where a secondary device is a pair of a transmission side wireless relay device and a reception side wireless relay device, as the traffic bonding scheme applied to the communication system according to the present example embodiment. However, the number of pairs of secondary devices included in the communication system according to the present example embodiment may be two or more.

Figure 8:
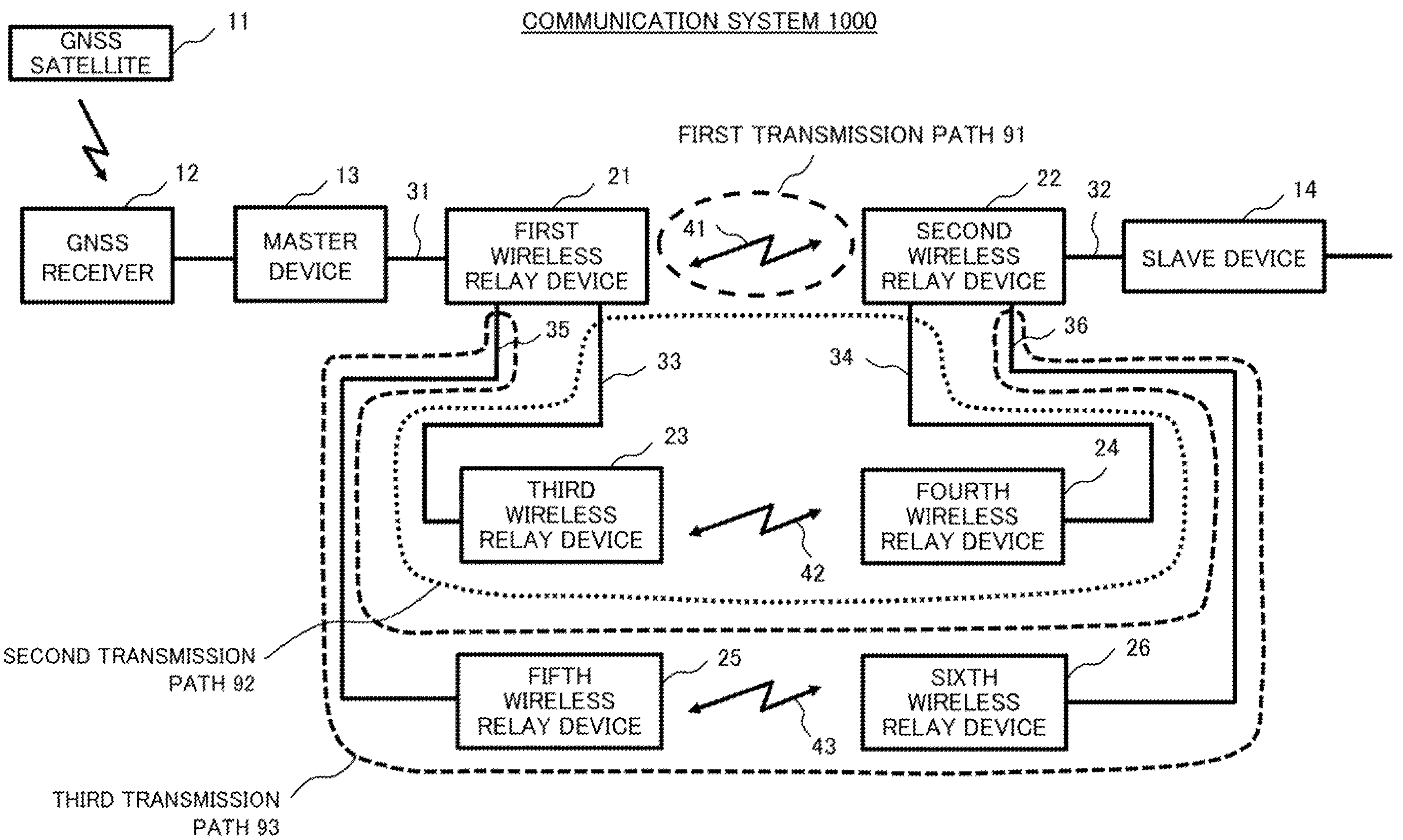
FIG. 8 is a conceptual diagram representing a configuration example (part 2) of the communication system according to the present example embodiment.

FIG. 8 is a conceptual diagram representing a configuration example of the communication system 1000 being an example of the communication system according to the present example embodiment including two pairs of secondary devices. The communication system 1000 in FIG. 8 includes wired transmission paths 35 and 36, a fifth wireless relay device 25, and a sixth wireless relay device 26, in addition to the configuration included in the communication system 1000 in FIG. 1. The fifth wireless relay device 25 and the sixth wireless relay device 26 are secondary devices that include configurations similar to and perform operations similar to those of the third wireless relay device 23 and the fourth wireless relay device 24.

A wireless transmission path 43 is formed between the fifth wireless relay device 25 and the sixth wireless relay device 26. A third transmission path 93 is composed of the wired transmission path 35, the fifth wireless relay device 25, the wireless transmission path 43, the sixth wireless relay device 26, and the wired transmission path 36.

A part of an operation performed in the communication system 1000 in FIG. 8 differing from that of the communication system 1000 in FIG. 1 is mainly described below.

When the wireless transmission path 41 is in communication, the first wireless relay device 21 allocates and sends out a division packet to each of the first transmission path 91, the second transmission path 92, and the third transmission path 93. In this instance, a priority order regarding which transmission path a division packet is allocated may be previously determined.

On the other hand, when the wireless transmission path 41 is not in communication, the first wireless relay device 21 allocates and sends out a packet including a time synchronization packet to each of the second transmission path 92 and the third transmission path 93. In this instance, the first wireless relay device 21 does not perform division of a time synchronization packet, but whether to perform division regarding other packets is optional. A priority order regarding which transmission path a packet is allocated may be previously determined.

In the communication system 1000 in FIG. 8, a packet passing through each of the first transmission path 91, the second transmission path 92, and the third transmission path 93 is a division packet when the wireless transmission path 41 is in communication. Thus, update of a correction value of a time synchronization packet is not performed in the second transmission path 92 or the third transmission path 93. This can avoid a problem that a delay amount required to pass through each of the transmission paths is doubly added in a time synchronization packet sent from the second wireless relay device 22.

Then, update of a correction value is performed by a set of the first wireless relay device 21 and the second wireless relay device 22, regarding an undivided time synchronization packet before division and after synthesis, and, therefore, which transmission path a division packet regarding the packet passes through does not affect update of a correction value. Thus, a combination of the first wireless relay device 21 and the second wireless relay device 22 can perform update of a correction value even when the wireless transmission path 41 is in communication and a packet is allocated to each of the first transmission path 91, the second transmission path 92, and the third transmission path 93.

On the other hand, when the wireless transmission path 41 is not in communication, the first wireless relay device 21 does not divide at least a time synchronization packet. Then, a combination of the first wireless relay device 21 and the second wireless relay device 22 adds, to a time synchronization packet arriving at the wireless relay device itself, a design value (set value) of a delay amount required for the time synchronization packet to arrive at the wireless relay device itself and be then sent out.

The first wireless relay device 21 sends out a time synchronization packet to either of the second transmission path 92 and the third transmission path 93 without dividing the time synchronization packet, but the time synchronization packet that has been sent out stores, in a header thereof, an identifier indicating that the packet is a time synchronization packet. Thus, the second transmission path 92 or the third transmission path 93 each adds, to a correction value, a delay amount required to pass through each of the transmission paths, by the method in PTL 1.

Thus, in a time synchronization packet sent out from the second wireless relay device 22, a delay amount required for the time synchronization packet to be sent to the first wireless relay device 21 and then sent out from the second wireless relay device 22 is added to a correction value.

Consequently, the communication system 1000 in FIG. 8 is capable of updating a correction value of a time synchronization packet, regardless of presence or absence of communication in the wireless transmission path 41.

Advantageous Effect

In the communication system according to the present example embodiment, a transmission side primary device divides a time synchronization packet when a wireless transmission path between the previously described primary devices is in communication. Then, the transmission side primary device allocates and sends out a division packet to the wireless transmission path between the primary devices and a transmission path going through a secondary device. Since a division packet does not include, in a header thereof, identification information representing a time synchronization packet, the secondary device does not identify that the packet is a time synchronization packet, and update of a correction value of a time synchronization packet is not performed. This can avoid a problem that a delay amount required to pass through the secondary device is doubly added, in addition of a delay amount to a correction value of a time synchronization packet performed between the primary devices.

When a wireless transmission path between the primary devices is not in communication, the transmission side primary device does not divide a time synchronization packet. Then, each of a pair of primary devices adds, to a time synchronization packet arriving at the primary device itself, a design value (set value) of a delay amount required for the time synchronization packet to arrive at the primary device itself and be then sent out.

The transmission side primary device sends out a time synchronization packet to a transmission path going through the secondary device without dividing the time synchronization packet, but the time synchronization packet that has been sent out stores, in a header thereof, an identifier indicating that the packet is a time synchronization packet. Thus, the secondary devices to be gone through each add, to a correction value, a delay amount required to pass through the secondary devices, by the method in PTL 1.

Thus, in a time synchronization packet sent out from a reception side primary device, a delay amount required for the time synchronization packet to be sent to the transmission side primary device and then sent out from the reception side primary device is added to a correction value.

Consequently, the communication system according to the present example embodiment is capable of updating a correction value of a time synchronization packet, regardless of presence or absence of communication in a wireless transmission path between primary devices.

In the communication system according to the present example embodiment, when a wireless transmission path between primary devices is not in communication, a delay amount required for a time synchronization packet to pass through inside of each primary device is set to a fixed value being a design value (set value). Thus, when it is supposed that a delay amount required to pass through inside of each primary device varies, an error occurs in a correction value after update. However, a time synchronization packet is generally sent out in such a high priority order that stay or the like of a packet does not vary, and it is considered that a case where such a problem occurs is not assumed.

A case where a failure occurs in a wireless transmission path between secondary devices is assumed. In this respect, for example, a frame including information regarding whether a wireless transmission path between a transmission side secondary device and a reception side secondary device is in communication may be transmitted and received between the transmission side secondary device and the reception side secondary device. Then, when a wireless transmission path between secondary devices related to a certain transmission side secondary device is not in communication regarding the secondary device, a transmission side primary device allocates a packet to another transmission path.

Naturally, allocation of a packet becomes impossible when all transmission paths are not in communication, but an update method of a correction value according to the present example embodiment is not intended for such a case.

The above description describes an example in which information representing a delay amount is a correction value used in a correction for time synchronization in a communication device being a sending destination, and a packet storing a correction value is a time synchronization packet. However, a purpose of use of an information value in a time unit representing a delay amount is optional, and a name of a packet storing the information value is also optional. A name of the packet may be, for example, a storage packet in that the packet is a packet storing the information value.

Figure 9:
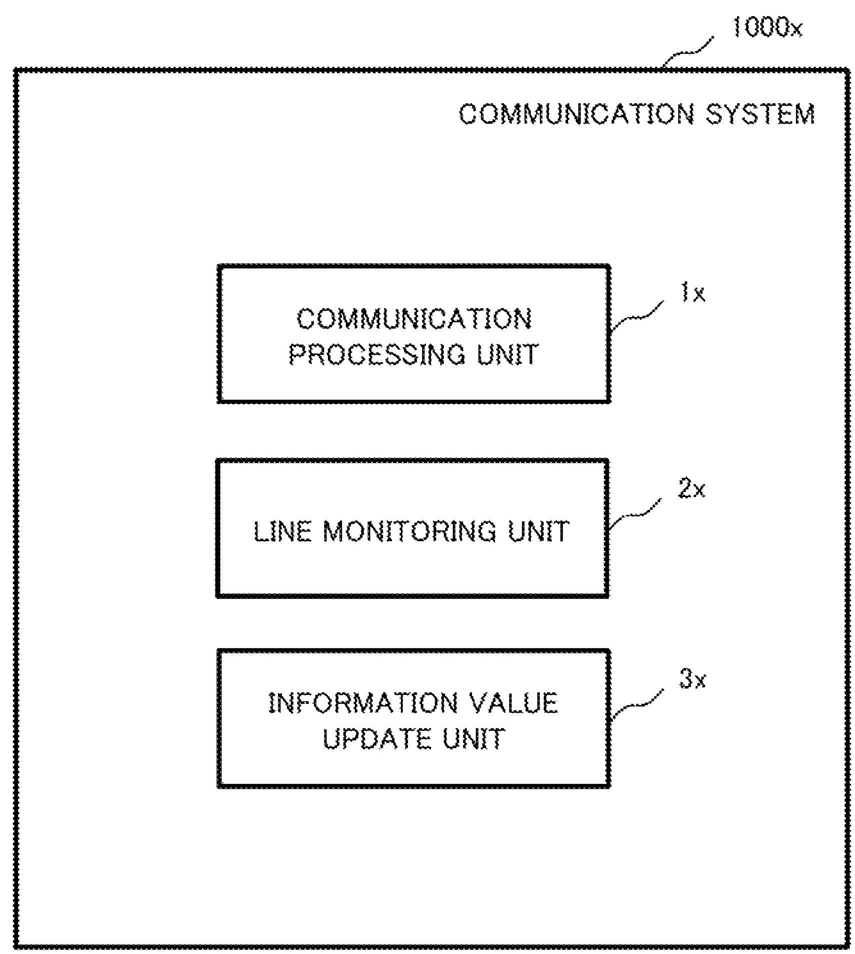
FIG. 9 is a conceptual diagram representing a minimum configuration of the communication system according to the present example embodiment.

FIG. 9 is a block diagram representing a configuration of a communication system 1000*x* being a minimum configuration of a communication system according to the present example embodiment. The communication system 1000*x* includes a communication processing unit 1*x*, a line monitoring unit 2*x*, and an information value update unit 3*x*. The communication processing unit 1*x* performs transmission of a packet from a wireless transmission device to a wireless reception device by a first transmission path and a second transmission path composed of one or more transmission paths, and reception of the packet by the wireless reception device.

The line monitoring unit 2*x* determines presence or absence of communication in the first transmission path.

The information value update unit 3*x* adds, to an information value held by a storage packet being a predetermined packet, an actual measurement value of a first delay amount, when a determination result according to the determination by the line monitoring unit is that the communication is present. The first delay amount is a delay amount in a predetermined time unit representing a time required for the storage packet to be input to the wireless transmission device and then output from the wireless reception device. Alternatively, the information value update unit 3*x* adds, to the information value, a set value of the delay amount inside the wireless transmission device and the wireless reception device, when the determination result is that the communication is absent.

The communication processing unit performs the transmission and the reception by dividing the storage packet when a determination result according to the determination by the line monitoring unit is that the communication is present. Alternatively, the communication processing unit performs the transmission and the reception without dividing the storage packet when the determination result is that the communication is absent.

The first transmission path is a wireless transmission path between the wireless transmission device and the wireless reception device.

The second transmission path is a transmission path going through a transmission side wireless relay device connected to the wireless transmission device, and a reception side wireless relay device that forms a second wireless transmission path between the transmission side wireless relay device and the reception side wireless relay device, and that is connected to the wireless reception device. Herein, a set of the transmission side wireless relay device and the reception side wireless relay device adds a second delay amount to the information value of the undivided storage packet. The second delay amount is the delay amount representing a time required for the storage packet to be sent to the transmission side wireless relay device and then sent out from the reception side wireless relay device.

By the configuration described above, the communication system 1000*x* enables updating of the information value both when the first transmission path is in communication and when the first transmission path is not in communication. Thus, the communication system 1000*x* enables update of a correction value of a time synchronization packet being the information value both when the first transmission path is in communication and when the first transmission path is not in communication.

Thus, the communication system 1000*x* provides, by the configuration described above, an advantageous effect described in the paragraph SUMMARY.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Some or all of the example embodiments described above can also be described as, but are not limited to, the following supplementary notes.

(Supplementary Note 1)

A communication system including:

a communication processing unit that performs transmission of a packet from a wireless transmission device to a wireless reception device by a first transmission path and a second transmission path composed of one or more transmission paths, and reception of the packet by the wireless reception device;

a line monitoring unit that determines presence or absence of communication in the first transmission path; and an information value update unit that adds, to an information value held by a storage packet being a predetermined packet, an actual to measurement value of a first delay amount being a delay amount in a predetermined time unit representing a time required for the storage packet to be input to the wireless transmission device and then output from the wireless reception device, when a determination result according to the determination by the line monitoring unit is that the communication is present, or adds, to the information value, a set value of the delay amount inside the wireless transmission device and the wireless reception device, when the determination result is that the communication is absent, wherein the communication processing unit performs the transmission and the reception by dividing the storage packet when a determination result according to the determination by the line monitoring unit is that the communication is present, or performs the transmission and the reception without dividing the storage packet when the determination result is that the communication is absent, the first transmission path is a wireless transmission path between the wireless transmission device and the wireless reception device, and the second transmission path is a transmission path going through a transmission side wireless relay device connected to the wireless transmission device, and a reception side wireless relay device that forms a second wireless transmission path between the transmission side wireless relay device and the reception side wireless relay device, and that is connected to the wireless reception device, and a set of the transmission side wireless relay device and the reception side wireless relay device adds, to the information value of the undivided storage packet, a second delay amount being the delay amount representing a time required for the storage packet to be sent to the transmission side wireless relay device and then sent out from the reception side wireless relay device.

(Supplementary Note 2)

The communication system according to supplementary note 1, wherein the information value update unit performs addition of an actual measurement value of the first delay amount to the information value, by subtraction, in the wireless transmission device, of a first count value in the time unit from the information value of the storage packet before divided, and addition, in the wireless reception device, of a second count value being synchronous with the first count value and substantially equal to the first count value, to the information value of the storage packet after assembly of the divided storage packet.

(Supplementary Note 3)

The communication system according to supplementary note 1 or 2, wherein the information value update unit performs addition of an actual measurement value of the second delay amount to the information value, by subtraction, in the transmission side wireless relay device, of a third count value in the time unit from the information value of the storage packet, and addition, in the reception side wireless relay device, of a fourth count value being synchronous with the third count value and substantially equal to the third count value, to the information value of the storage packet.

(Supplementary Note 4)

The communication system according to any one of supplementary notes 1 to 3, wherein the communication processing unit performs transmission and reception by dividing the storage packet, in such a way as to allocate to the storage packet to each of the first transmission path and the second transmission path, when the determination result is that the communication is present.

(Supplementary Note 5)

The communication system according to any one of supplementary notes 1 to 4, further including a set of the transmission side wireless relay device and the reception side wireless relay device.

(Supplementary Note 6)

The communication system according to any one of supplementary notes 1 to 5, further including a plurality of sets of the transmission side wireless relay device and the reception side wireless relay device.

(Supplementary Note 7)

The communication system according to supplementary note 6, wherein the communication processing unit performs transmission and reception of the packet, in such a way as to allocate the packet to each of a plurality of sets of the transmission side wireless relay device and the reception side wireless relay device.

(Supplementary Note 8)

The communication system according to supplementary note 7, wherein the communication processing unit performs allocation to the plurality of sets of the transmission side wireless relay device and the reception side wireless relay device according to a previously determined priority order.

(Supplementary Note 9)

A communication method including performing transmission of a packet from a wireless transmission device to a wireless reception device by a first transmission path and a second transmission path, wherein the first transmission path is a wireless transmission path between the wireless transmission device and the wireless reception device, the second transmission path is a transmission path going through a transmission side wireless relay device connected to the wireless transmission device, and a reception side wireless relay device that forms a second wireless transmission path between the transmission side wireless relay device and the reception side wireless relay device, and that is connected to the wireless reception device, the packet includes a storage packet storing an information value in a predetermined time unit to which a first delay amount being a delay amount in the time unit representing a time required for the storage packet to be input to the wireless transmission device and then output from the wireless reception device is added at a point of being output from the wireless reception device, a set of the transmission side wireless relay device and the reception side wireless relay device adds, to the information value of the undivided storage packet, a second delay amount being the delay amount representing a time required for the storage packet to be sent to the transmission side wireless relay device and then sent out from the reception side wireless relay device, and a set of the wireless transmission device and the wireless reception device determines presence or absence of communication in the first transmission path, adds an actual measurement value of the first delay amount to the information value when a determination result according to the determination is that the communication is present, or adds, to the information value, a set value of the delay amount inside the wireless transmission device and the wireless reception device when the determination result is that the communication is absent, and performs transmission and reception by dividing the storage packet when the determination result is that the communication is present, or performs transmission and reception without dividing the storage packet when the determination result is that the communication is absent.

(Supplementary Note 10)

A communication program causing a computer to execute:

performing transmission of a packet from a wireless transmission device to a wireless reception device by a first transmission path and a second transmission path, wherein the first transmission path is a wireless transmission path between the wireless transmission device and the wireless reception device, the second transmission path is a transmission path going through a transmission side wireless relay device connected to the wireless transmission device, and a reception side wireless relay device that forms a second wireless transmission path between the transmission side wireless relay device and the reception side wireless relay device, and that is connected to the wireless reception device, the packet includes a storage packet storing an information value in a predetermined time unit to which a first delay amount being a delay amount in the time unit representing a time required for the storage packet to be input to the wireless transmission device and then output from the wireless reception device is added at a point of being output from the wireless reception device, a set of the transmission side wireless relay device and the reception side wireless relay device adds, to the information value of the undivided storage packet, a second delay amount being the delay amount representing a time required for the storage packet to be sent to the transmission side wireless relay device and then sent out from the reception side wireless relay device, and the program causes the computer included in each of the wireless transmission device and the wireless reception device further to execute:

processing of determining presence or absence of communication in the first transmission path;

processing of adding an actual measurement value of the first delay amount to the information value when a determination result according to the determination is that the communication is present, or adding, to the information value, a set value of the delay amount inside the wireless transmission device and the wireless reception device when the determination result is that the communication is absent; and processing of performing transmission and reception by dividing the storage packet when the determination result is that the communication is present, or performing transmission and reception without dividing the storage packet when the determination result is that the communication is absent.

The "communication processing unit" in the supplementary notes described above is, for example, a combination of the packet processing unit 214 and the wireless processing unit 215 in FIG. 5, and the packet processing unit 224 and the wireless processing unit 225 in FIG. 7. The "line monitoring unit" is, for example, a combination of the line monitoring unit 217 in FIG. 5, and the line monitoring unit 227 in FIG. 7. The "information value update unit" is, for example, a combination of the correction value update unit 213 in FIG. 5, and the correction value update unit 223 in FIG. 7.

The "first transmission path" is, for example, the first transmission path 91 in FIG. 1 or 8. The "second transmission path" is, for example, the second transmission path 92 in FIG. 1 or 8. The "wireless transmission device" is, for example, the first wireless relay device 21 in FIG. 1 or 8, or the previously described transmission side primary device.

The "wireless reception device" is, for example, the second wireless relay device 22 in FIG. 1 or 8, or the previously described reception side primary device. The "communication system" is, for example, the communication system 1000 in FIG. 1 or 8. The "transmission side wireless relay device" is, for example, the third wireless relay device 23 in FIG. 1 or 8, the fifth wireless relay device 25 in FIG. 8, or the previously described transmission side secondary device.

The "second wireless transmission path" is, for example, the wireless transmission path 42 in FIG. 1 or 8 or the wireless transmission path 43 in FIG. 8. The "reception side wireless relay device" is, for example, the fourth wireless relay device 24 in FIG. 1 or 8, the sixth wireless relay device 26 in FIG. 8, or the previously described reception side secondary device. The "time unit" is, for example, the previously described unit of counting the number of clocks of a clock signal.

The "delay amount" is, for example, the previously described delay time. The "first delay amount" is, for example, an amount representing a time for the previously described time synchronization packet to be input to the first wireless relay device 21 in FIG. 1 or 8 and then output from the second wireless relay device 22. The "information value" is, for example, the previously described count value.

The "storage packet" is, for example, the previously described time synchronization packet. The "second delay amount" is, for example, an amount representing a time for the previously described time synchronization packet to be input to the third wireless relay device 23 in FIG. 1 or 8 and then output from the fourth wireless relay device 24. Alternatively, the "second delay amount" is, for example, an amount representing a time for the previously described time synchronization packet to be input to the fifth wireless relay device 25 in FIG. 8 and then output from the sixth wireless relay device 26.

The "actual measurement value of the first delay amount" is, for example, a count value in which a count value subtracted from the previously described correction value by the first wireless relay device 21, from a count value added to the previously described correction value by the second wireless relay device 22. The "communication system" is, for example, the communication system 1000 in FIG. 1 or 8.

The "computer" is, for example, a combination of the computer included in the first wireless relay device 21 in FIG. 1 or 8 and the computer included in the second wireless relay device 22. The "communication program" is a program causing the computer to execute processing, and is stored in a non-illustrated storage device included in each of the first wireless relay device 21 and the second wireless relay device 22.

REFERENCE SIGNS LIST

1*x* Communication processing unit
1000 Communication system
11 GNSS satellite
12 GNSS receiver
13 Master device
14 Slave device
2*x* Line monitoring unit
21 First wireless relay device
211, 221 Counter
212, 219, 222, 229 Port unit
213, 223 Correction value update unit
214, 224 Packet processing unit
215, 225 Wireless processing unit
216, 226 Delay measurement unit
217, 227 Line monitoring unit
218, 228 Packet identification unit
21*a* Division processing unit
21*b* Line allocation processing unit
22 Second wireless relay device
22*a* Assembly processing unit
23 Third wireless relay device
24 Fourth wireless relay device
25 Fifth wireless relay device
26 Sixth wireless relay device
3*x* Information value update unit
31, 32, 33, 34, 35, 36 Wired transmission path
41, 42, 43 Wireless transmission path
91 First transmission path
92 Second transmission path
93 Third transmission path The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A communication method comprising:

performing transmission of a packet from a wireless transmission device to a wireless reception device by a first transmission path and a second transmission path composed of one or more transmission paths performing reception of the packet by the wireless reception device;

determining presence or absence of communication in the first transmission path; and adding, to an information value held by a storage packet, an actual measurement value of a first delay amount in a predetermined time unit representing a time required for the storage packet to be input to the wireless transmission device and then output from the wireless reception device, when the communication has been determined as being present in the first transmission path;

adding, to the information value, a set value of the first delay amount inside the wireless transmission device and the wireless reception device, when the communication has been determined as being absent from the first communication path, wherein the transmission and the reception are performed by dividing the storage packet when the communication has been determined as being present in the first communication path;

the transmission and the reception are performed without dividing the storage packet when the communication has been determined as being absent from the first communication path, the first transmission path is a wireless transmission path between the wireless transmission device and the wireless reception device, the second transmission path is a transmission path through a transmission side wireless relay device connected to the wireless transmission device, and through a reception side wireless relay device that forms a second wireless transmission path between the transmission side wireless relay device and the reception side wireless relay device, the reception side wireless relay device connected to the wireless reception device, and a set of the transmission side wireless relay device and the reception side wireless relay device adds, to the information value of the storage packet when the storage packet is undivided, a second delay representing a time required for the storage packet to be sent to the transmission side wireless relay device and then output from the reception side wireless relay device.

2. The communication method according to claim 1, wherein the actual measurement value of the first delay amount is added to the information value by subtraction, in the wireless transmission device, of a first count value in the predetermined time unit from the information value of the storage packet before being divided, and by addition, in the wireless reception device, of a second count value being synchronous with the first count value and substantially equal to the first count value, to the information value of the storage packet after assembly of the storage packet after having been divided.

3. The communication method according to claim 1, wherein the second delay amount is added to the information value as an actual measurement value of the second delay amount by subtraction, in the transmission side wireless relay device, of a third count value in the predetermined time unit from the information value of the storage packet, and addition, in the reception side wireless relay device, of a fourth count value being synchronous with the third count value and substantially equal to the third count value, to the information value of the storage packet.

4. The communication method according to claim 1, wherein the transmission and reception are performed by dividing the storage packet in such a way as to allocate to the storage packet to each of the first transmission path and the second transmission path, when the communication has been determined as being present in the first transmission path.

5. The communication method according to claim 1, wherein the transmission and reception of the packet are performed in such a way as to allocate the packet to each of a plurality of sets of the transmission side wireless relay device and the reception side wireless relay device.

6. The communication method according to claim 5, wherein the set of the transmission side wireless relay device and the reception side wireless relay device is one of a plurality of sets of the transmission side wireless relay device and the reception side wireless relay device, the communication method further comprising performing allocation to the plurality of sets according to a previously determined priority order.

7. A non-transitory computer-readable medium storing a communication program that when executed by a computer causes the causing a computer to execute:

performing transmission of a packet from a wireless transmission device to a wireless reception device by a first transmission path and a second transmission path composed of one or more transmission paths performing reception of the packet by the wireless reception device;

determining presence or absence of communication in the first transmission path; and adding, to an information value held by a storage packet, an actual measurement value of a first delay amount in a predetermined time unit representing a time required for the storage packet to be input to the wireless transmission device and then output from the wireless reception device, when the communication has been determined as being present in the first transmission path;

adding, to the information value, a set value of the first delay amount inside the wireless transmission device and the wireless reception device, when the communication has been determined as being absent from the first communication path, wherein the transmission and the reception are performed by dividing the storage packet when the communication has been determined as being present in the first communication path;

the transmission and the reception are performed without dividing the storage packet when the communication has been determined as being absent from the first communication path, the first transmission path is a wireless transmission path between the wireless transmission device and the wireless reception device, the second transmission path is a transmission path through a transmission side wireless relay device connected to the wireless transmission device, and through a reception side wireless relay device that forms a second wireless transmission path between the transmission side wireless relay device and the reception side wireless relay device, the reception side wireless relay device connected to the wireless reception device, and a set of the transmission side wireless relay device and the reception side wireless relay device adds, to the information value of the storage packet when the storage packet is undivided, a second delay representing a time required for the storage packet to be sent to the transmission side wireless relay device and then output from the reception side wireless relay device.

* * * * *